United States Patent
Lai et al.

(10) Patent No.: US 8,793,175 B2
(45) Date of Patent: Jul. 29, 2014

(54) METHOD FOR EXECUTING A SINGLE TRANCHE SYNTHETIC ABS DERIVATIVE TRANSACTION

(75) Inventors: Jonathan Lai, New York, NY (US);
Jeong Gu Lee, Guttenberg, NJ (US)

(73) Assignee: Barclays Capital Inc., New York, NY (US)

( * ) Notice: Subject to any disclaimer, the term of this patent is extended or adjusted under 35 U.S.C. 154(b) by 180 days.

(21) Appl. No.: 12/831,423

(22) Filed: Jul. 7, 2010

(65) Prior Publication Data
US 2010/0325066 A1 Dec. 23, 2010

Related U.S. Application Data

(62) Division of application No. 11/851,297, filed on Sep. 6, 2007.

(60) Provisional application No. 60/842,796, filed on Sep. 6, 2006.

(51) Int. Cl.
*G06Q 40/00* (2012.01)

(52) U.S. Cl.
USPC ........................................ 705/36 R

(58) Field of Classification Search
USPC .................... 705/36 R, 35, 36 T, 37
See application file for complete search history.

(56) References Cited

U.S. PATENT DOCUMENTS

| 2003/0101120 A1 | 5/2003 | Tilton |
| 2004/0143528 A1* | 7/2004 | Spieler et al. .................. 705/35 |

OTHER PUBLICATIONS

Office Action for U.S. Appl. No. 11/851,297 dated May 11, 2010.
Roger Merritt, Tania Cunningham, Jill Zelter, Grant Bailey, Kenneth Gill, ABX.HE CDS Index: Study of Available Funds Cap Risk in ABS CDS, Aug. 14, 2006, FitchRatings Credit Policy, pp. 1-6.

* cited by examiner

*Primary Examiner* — Greg Pollock
(74) *Attorney, Agent, or Firm* — Morgan Lewis & Bockius LLP

(57) ABSTRACT

A Single Tranche Synthetic ABS product designed to replicate economics returns of structured finance collateralized debt obligations (SF CDO) securities, allow parties to express a leveraged and/or correlation view on a custom ABS portfolio by transferring a credit risk of a particular transacted tranche of a portfolio in swap format, and account for an available funds cap risk of the ABS securities within the underlying portfolio in a manner equivalent to a cash analog based on the same underlying portfolio with sequential pay structure.

6 Claims, 14 Drawing Sheets

| 15 | Original Tranche Notional | Attachment Point | Detachment Point | Fixed Rate | Loss Threshold | Loss Cap |
|---|---|---|---|---|---|---|
| Tranche 1: 0-5% | 5,000,000.00 | 0.00% | 5.00% | 19.4500% | 0.00 | 5,000,000.00 |
| Tranche 2: 5-11% | 6,000,000.00 | 5.00% | 11.00% | 4.0000% | 5,000,000.00 | 11,000,000.00 |
| Tranche 3: 11-17% | 6,000,000.00 | 11.00% | 17.00% | 2.0000% | 11,000,000.00 | 17,000,000.00 |
| Tranche 4: 17-25% | 8,000,000.00 | 17.00% | 25.00% | 0.7500% | 17,000,000.00 | 25,000,000.00 |
| Tranche 5: 25-100% | 75,000,000.00 | 25.00% | 100.00% | 0.2200% | 25,000,000.00 | 100,000,000.00 |

90

Sample Matrix

| Tranche | Reference Spread | Lower Strike | Upper Strike |
|---|---|---|---|
| 1 | $S_1 = [19.45]\%$ | $X_1 = [0.00]\%$ | $X_1 = [5.00]\%$ |
| 2 | $S_2 = [4.00]\%$ | $X_2 = [5.00]\%$ | $X_2 = [11.00]\%$ |
| 3 | $S_3 = [2.00]\%$ | $X_3 = [11.00]\%$ | $X_3 = [17.00]\%$ |
| 4 | $S_4 = [0.75]\%$ | $X_4 = [17.00]\%$ | $X_4 = [25.00]\%$ |
| 5 | $S_5 = [0.27]\%$ | $X_5 = [25.00]\%$ | $X_5 = [100.00]\%$ |
| Portfolio | PRS = [1.56]% | 0.00 | 100.00% |

FIG. 2

Tranched ABX CF Model

Summary of Principal Shortfall Calculations

General Terms

| | |
|---|---|
| Original Tranche Notional | 6,000,000.00 |
| Attachment Point | 11.0% |
| Detachment Point | 17.00% |
| Initial Portfolio Size | 100,000,000.00 |
| Initial Tranche Factor | 100.00% |
| Weighting | 1.25% |
| Fixed Rate | 2.00% |
| Ref Ob Notional Amount | 1,250,000 |
| Loss Threshold | 11,000,000.00 |
| Loss Cap | 17,000,000.00 |

Other Tranche Inputs

| | |
|---|---|
| X 0 | 0.00% |
| X 1 | 5.00% |
| X 2 | 11.000% |
| X 3 | 17.000% |
| X 4 | 25.000% |
| X 5 | 100.000% |

Other Spread Inputs

| | | |
|---|---|---|
| S 1 | 19.450% | 62.440% |
| S 2 | 4.00% | 15.409% |
| S 3 | 2.000% | 7.705% |
| S 4 | 0.750% | 3.852% |
| S 5 | 0.220% | 10.594% |
| Portfolio | 1.558% | 100.000% |

Implied Capital Structure

| | |
|---|---|
| Tranche 1 | 0-5 @ 1945 bps |
| Tranche 2 | 5-11% @ 400 bps |
| Tranche 3 | 11-17% @ 200 bps |
| Tranche 4 | 17-25% @ 75 bps |
| Tranche 5 | 25-100% @ 22 bps |

Rate: 5.00%

| | Period 1 | Period 2 | Period 3 | Period 4 | Period 5 | Period 6 | Period 7 | Period 8 | Period 9 | Period 10 |
|---|---|---|---|---|---|---|---|---|---|---|
| Outstanding Tranche Notional | 6,000,000.00 | 6,000,000.00 | 6,000,000.00 | 2,000,000.00 | 0.00 | 0.00 | 2,000,000.00 | 4,500,000.00 | 6,000,000.00 | 6,000,000.00 |
| Outstanding Portfolio Size | 100,000,000.00 | 95,000,000.00 | 90,000,000.00 | 85,000,000.00 | 80,000,000.00 | 82,500,000.00 | 85,000,000.00 | 87,500,000.00 | 90,000,000.00 | 92,500,000.00 |
| N Days | 30 | 30 | 30 | 30 | 30 | 30 | 30 | 30 | 30 | 30 |
| Fixed Leg - Buyer | | | | | | | | | | |
| Fixed Amount | 10,000.00 | 10,000.00 | 10,000.00 | 10,000.00 | 3,333.33 | 0.00 | 0.00 | 3,333.33 | 7,500.00 | 10,000.00 |
| Additional Fixed Amount | 0.00 | 0.00 | 0.00 | 0.00 | 0.00 | 0.00 | 2,000,000.00 | 2,500,000.00 | 1,500,000.00 | 0.00 |
| Floating Payments - Seller | | | | | | | | | | |
| Floating Amount | 0.00 | 0.00 | 0.00 | 4,000,000.00 | 2,000,000.00 | 0.00 | 0.00 | 0.00 | 0.00 | 0.00 |
| Principal | | | | | | | | | | |
| Principal Payments | 0.00 | 0.00 | 0.00 | 0.00 | 0.00 | 0.00 | 0.00 | 0.00 | 0.00 | 0.00 |
| Writedown | 0.00 | 5,000,000.00 | 5,000,000.00 | 5,000,000.00 | 5,000,000.00 | 2,500,000.00 | 2,500,000.00 | 2,500,000.00 | 2,500,000.00 | 2,500,000.00 |
| Writedown Reimbursement | 0.00 | 0.00 | 0.00 | 0.00 | 0.00 | 0.00 | 0.00 | 0.00 | 0.00 | 0.00 |
| Principal Shortfall | 0.00 | 0.00 | 0.00 | 0.00 | 0.00 | 0.00 | 0.00 | 0.00 | 0.00 | 0.00 |
| Principal Shortfall Reimbursement | 0.00 | 0.00 | 0.00 | 0.00 | 0.00 | 0.00 | 0.00 | 0.00 | 0.00 | 0.00 |
| Periodic Principal Loss | 0.00 | 5,000,000.00 | 5,000,000.00 | 5,000,000.00 | 5,000,000.00 | 0.00 | 0.00 | 0.00 | 0.00 | 0.00 |
| Aggregate Principal Loss | 0.00 | 5,000,000.00 | 10,000,000.00 | 15,000,000.00 | 20,000,000.00 | 17,500,000.00 | 15,000,000.00 | 12,500,000.00 | 10,000,000.00 | 7,500,000.00 |
| Incurred Principal Loss | 0.00 | 0.00 | 0.00 | 4,000,000.00 | 2,000,000.00 | 0.00 | 0.00 | 0.00 | 0.00 | 0.00 |
| Periodic Principal Reimbursement | 0.00 | 0.00 | 0.00 | 0.00 | 0.00 | 2,500,000.00 | 2,500,000.00 | 2,500,000.00 | 2,500,000.00 | 2,500,000.00 |
| Incurred Principal Reimbursement | 0.00 | 0.00 | 0.00 | 0.00 | 0.00 | 0.00 | 0.00 | 0.00 | 0.00 | 0.00 |

Summary of Interest Shortfall Calculations

| | Period 1 | Period 2 | Period 3 | Period 4 | Period 5 | Period 6 | Period 7 | Period 8 |
|---|---|---|---|---|---|---|---|---|
| Principal | | | | | | | | |
| Principal Payments | 0 | 0 | 0 | 0 | 0 | 0 | 0 | 0 |
| Writedown | 0 | 0 | 0 | 0 | 0 | 0 | 0 | 0 |
| Writedown Reimbursement | 0 | 0 | 0 | 0 | 0 | 0 | 0 | 0 |
| Principal Shortfall | 0 | 0 | 0 | 0 | 0 | 0 | 0 | 0 |
| Principal Shortfall Reimbursement | 0 | 0 | 0 | 0 | 0 | 0 | 0 | 0 |
| PPL | 0 | 0 | 0 | 0 | 0 | 0 | 0 | 0 |
| APL | 0 | 0 | 0 | 0 | 0 | 0 | 0 | 0 |
| PPR | 0 | 0 | 0 | 0 | 0 | 0 | 0 | 0 |
| OPS | 100M | 100M | 100M | 100M | 100M | 100M | 100M | 100M |
| Interest | | | | | | | | |
| ISA | 10,000 | 20,000 | 30,000 | 40,000 | 50,0000 | 60,0000 | 70,0000 | 80,000 |
| ISRA | 0 | 0 | 0 | 0 | 0 | 0 | 0 | 0 |
| PIS | 10,000 | 20,000 | 30,000 | 40,000 | 50,000 | 60,000 | 70,000 | 80,000 |
| PISR | 0 | 0 | 0 | 0 | 0 | 0 | 0 | 0 |
| Relevant Rate (LIBOR) | 5.2500% | 5.2500% | 5.2500% | 5.2500% | 5.2500% | 5.2500% | 5.2500% | 5.2500% |
| N Days | 30 | 30 | 30 | 30 | 30 | 30 | 30 | 30 |
| Interest Shortfall Annex | | | | | | | | |
| AAP | 129,791.67 | 129,791.67 | 129,791.67 | 129,791.67 | 129,791.67 | 129,791.67 | 129,791.67 | 129,791.67 |
| ALP | 0% | 0% | 0% | 0% | 0% | 0% | 0% | 0% |
| OP% | 100% | 100% | 100% | 100% | 100% | 100% | 100% | 100% |
| OTW1 | 5% | 5% | 5% | 5% | 5% | 5% | 5% | 5% |
| OTW2 | 6% | 6% | 6% | 6% | 6% | 6% | 6% | 6% |
| OTW3 | 6% | 6% | 6% | 6% | 6% | 6% | 6% | 6% |
| OTW4 | 8% | 8% | 8% | 8% | 8% | 8% | 8% | 8% |
| OTW5 | 75% | 75% | 75% | 75% | 75% | 75% | 75% | 75% |
| FA1 | 81,041.67 | 81,041.67 | 81,041.67 | 81,041.67 | 81,041.67 | 81,041.67 | 81,041.67 | 81,041.67 |
| FA2 | 20,000 | 20,000 | 20,000 | 20,000 | 20,000 | 20,000 | 20,000 | 20,000 |
| FA 3 | 10,000 | 10,000 | 10,000 | 10,000 | 10,000 | 10,000 | 10,000 | 10,000 |
| FA 4 | 5,000 | 5,000 | 5,000 | 5,000 | 5,000 | 5,000 | 5,000 | 5,000 |
| FA 5 | 13,750 | 13,750 | 13,750 | 13,750 | 13,750 | 13,750 | 13,750 | 13,750 |

Fig 5B

Summary of Interest Shortfall Calculations (cont'd.)

| | Period 1 | Period 2 | Period 3 | Period 4 | Period 5 | Period 6 | Period 7 | Period 8 |
|---|---|---|---|---|---|---|---|---|
| IIS 1 | 10,000 | 20,000 | 30,000 | 40,000 | 50,000 | 60,000 | 70,000 | 80,000 |
| IIS 2 | 0 | 0 | 0 | 0 | 0 | 0 | 0 | 0 |
| IIS 3 | 0 | 0 | 0 | 0 | 0 | 0 | 0 | 0 |
| IIS 4 | 0 | 0 | 0 | 0 | 0 | 0 | 0 | 0 |
| IIS 5 | 0 | 0 | 0 | 0 | 0 | 0 | 0 | 0 |
| | | | | | | | | |
| IISR 1 | 0 | 0 | 0 | 0 | 0 | 0 | 0 | 0 |
| IISR2 | 0 | 0 | 0 | 0 | 0 | 0 | 0 | 0 |
| IISR3 | 0 | 0 | 0 | 0 | 0 | 0 | 0 | 0 |
| IISR4 | 0 | 0 | 0 | 0 | 0 | 0 | 0 | 0 |
| IISR5 | 0 | 0 | 0 | 0 | 0 | 0 | 0 | 0 |
| | | | | | | | | |
| ISCF 1 | 102.06% | 102.06% | 102.06% | 102.06% | 102.06% | 102.06% | 102.06% | 102.06% |
| ISCF 2 | 100.77% | 100.77% | 100.77% | 100.77% | 100.77% | 100.77% | 100.77% | 100.77% |
| ISCF 3 | 100.60% | 100.60% | 100.60% | 100.60% | 100.60% | 100.60% | 100.60% | 100.60% |
| ISCF 4 | 100.50% | 100.50% | 100.50% | 100.50% | 100.50% | 100.50% | 100.50% | 100.50% |
| ISCF 5 | 100.46% | 100.46% | 100.46% | 100.46% | 100.46% | 100.46% | 100.46% | 100.46% |
| | | | | | | | | |
| CIIS 1 | 10,000 | 30,205.83 | 60,825.57 | 102,079.60 | 154,180.74 | 217,354.30 | 291,828.17 | 377,834.97 |
| CIIS 2 | 0 | 0 | 0 | 0 | 0 | 0 | 0 | 0 |
| CIIS 3 | 0 | 0 | 0 | 0 | 0 | 0 | 0 | 0 |
| CIIS 4 | 0 | 0 | 0 | 0 | 0 | 0 | 0 | 0 |
| CIIS 5 | 0 | 0 | 0 | 0 | 0 | 0 | 0 | 0 |

Fig 5C

Summary of Interest Shortfall Calculations (cont'd.)

|  | Period 9 | Period 10 | Period 11 | Period 12 | Period 13 | Period 14 | Period 15 |
|---|---|---|---|---|---|---|---|
| Principal | | | | | | | |
| Principal Payments | 0 | 0 | 0 | 0 | 0 | 0 | 0 |
| Writedown | 0 | 0 | 0 | 0 | 0 | 0 | 0 |
| Writedown Reimbursement | 0 | 0 | 0 | 0 | 0 | 0 | 0 |
| Principal Shortfall | 0 | 0 | 0 | 0 | 0 | 0 | 0 |
| Principal Shortfall Reimbursement | 0 | 0 | 0 | 0 | 0 | 0 | 0 |
| PPL | 0 | 0 | 0 | 0 | 0 | 0 | 0 |
| APL | 0 | 0 | 0 | 0 | 0 | 0 | 0 |
| PPR | 0 | 0 | 0 | 0 | 0 | 0 | 0 |
| OPS | 100M | 100M | 100M | 100M | 100M | 100M | 100M |
| Interest | | | | | | | |
| ISA | 90,000 | 100,000 | 110,000 | 120,000 | 129,791.67 | 129,791.67 | 129,791.67 |
| ISRA | 0 | 0 | 0 | 0 | 0 | 0 | 0 |
| PIS | 90,000 | 100,000 | 110,000 | 120,000 | 129,791.67 | 129,791.67 | 129,791.67 |
| PISR | 0 | 0 | 0 | 0 | 0 | 0 | 0 |
| Relevant Rate (LIBOR) | 5.2500% | 5.2500% | 5.2500% | 5.2500% | 5.2500% | 5.2500% | 5.2500% |
| N Days | 30 | 30 | 30 | 30 | 30 | 30 | 30 |
| Interest Shortfall Annex | | | | | | | |
| AAP | 129,791.67 | 129,791.67 | 129,791.67 | 129,791.67 | 129,791.67 | 129,791.67 | 129,791.67 |
| ALP | 0% | 0% | 0% | 0% | 0% | 0% | 0% |
| OP% | 100% | 100% | 100% | 100% | 100% | 100% | 100% |
| OTW1 | 5% | 5% | 5% | 5% | 5% | 5% | 5% |
| OTW2 | 6% | 6% | 6% | 6% | 6% | 6% | 6% |
| OTW3 | 6% | 6% | 6% | 6% | 6% | 6% | 6% |
| OTW4 | 8% | 8% | 8% | 8% | 8% | 8% | 8% |
| OTW5 | 75% | 75% | 75% | 75% | 75% | 75% | 75% |

Fig 5D

Summary of Interest Shortfall Calculations (cont'd.)

|  | Period 9 | Period 10 | Period 11 | Period 12 | Period 13 | Period 14 | Period 15 |
|---|---|---|---|---|---|---|---|
| FA1 | 81,041.67 | 81,041.67 | 81,041.67 | 81,041.67 | 81,041.67 | 81,041.67 | 81,041.67 |
| FA2 | 20,000 | 20,000 | 20,000 | 20,000 | 20,000 | 20,000 | 20,000 |
| FA 3 | 10,000 | 10,000 | 10,000 | 10,000 | 10,000 | 10,000 | 10,000 |
| FA 4 | 5,000 | 5,000 | 5,000 | 5,000 | 5,000 | 5,000 | 5,000 |
| FA 5 | 13,750 | 13,750 | 13,750 | 13,750 | 13,750 | 13,750 | 13,750 |
| IIS 1 | 81,041.67 | 81,041.67 | 81,041.67 | 81,041.67 | 81,041.67 | 81,041.67 | 81,041.67 |
| IIS 2 | 8,958.33 | 18,958.33 | 20,000 | 20,000 | 20,000 | 20,000 | 20,000 |
| IIS 3 | 0 | 0 | 8,958.33 | 10,000 | 10,000 | 10,000 | 10,000 |
| IIS 4 | 0 | 0 | 0 | 5,000 | 5,000 | 5,000 | 5,000 |
| IIS 5 | 0 | 0 | 0 | 3,958.33 | 13,750 | 13,750 | 13,750 |
| IISR 1 | 0 | 0 | 0 | 0 | 0 | 0 | 0 |
| IISR2 | 0 | 0 | 0 | 0 | 0 | 0 | 0 |
| IISR3 | 0 | 0 | 0 | 0 | 0 | 0 | 0 |
| IISR4 | 0 | 0 | 0 | 0 | 0 | 0 | 0 |
| IISR5 | 0 | 0 | 0 | 0 | 0 | 0 | 0 |
| ISCF 1 | 102.06% | 102.06% | 102.06% | 102.06% | 102.06% | 102.06% | 102.06% |
| ISCF 2 | 100.77% | 100.77% | 100.77% | 100.77% | 100.77% | 100.77% | 100.77% |
| ISCF 3 | 100.60% | 100.60% | 100.60% | 100.60% | 100.60% | 100.60% | 100.60% |
| ISCF 4 | 100.50% | 100.50% | 100.50% | 100.50% | 100.50% | 100.50% | 100.50% |
| ISCF 5 | 100.46% | 100.46% | 100.46% | 100.46% | 100.46% | 100.46% | 100.46% |
| CIIS 1 | 466,653.74 | 557,300.69 | 649,813.47 | 744,230.46 | 840,590.87 | 938,934.70 | 1,039,302.77 |
| CIIS 2 | 8,958.33 | 27,985.72 | 48,201.44 | 68,573 | 89,101.58 | 109,788.40 | 130,634.69 |
| CIIS 3 | 0 | 0 | 8,958.33 | 19,012.46 | 29,127.32 | 39,303.30 | 49,540.76 |
| CIIS 4 | 0 | 0 | 0 | 5,000 | 10,025 | 15,075.13 | 20,150.50 |
| CIIS 5 | 0 | 0 | 0 | 3,958.33 | 17,726.38 | 31,557.18 | 45,451.03 |

Summary of Interest Shortfall Calculations

| | Period 21 | Period 22 | Period 23 | Period 24 | Period 25 | Period 26 | Period 27 | Period 28 |
|---|---|---|---|---|---|---|---|---|
| Principal | | | | | | | | |
| Principal Payments | 0 | 0 | 0 | 0 | 0 | 0 | 0 | 0 |
| Writedown | 0 | 0 | 0 | 0 | 0 | 0 | 0 | 0 |
| Writedown Reimbursement | 0 | 0 | 0 | 0 | 0 | 0 | 0 | 0 |
| Principal Shortfall | 0 | 0 | 0 | 0 | 0 | 0 | 0 | 0 |
| PSR | 0 | 0 | 0 | 0 | 0 | 0 | 0 | 0 |
| PPL | 0 | 0 | 0 | 0 | 0 | 0 | 0 | 0 |
| APL | 0 | 0 | 0 | 0 | 0 | 0 | 0 | 0 |
| PPR | 0 | 0 | 0 | 0 | 0 | 0 | 0 | 0 |
| OPS | 100M | 100M | 100M | 100M | 100M | 100M | 100M | 100M |
| Interest | | | | | | | | |
| ISA | 0 | 0 | 0 | 0 | 0 | 0 | 0 | 0 |
| ISRA | 10,000 | 20,000 | 30,000 | 40,000 | 50,000 | 60,000 | 70,000 | 80,000 |
| PIS | 0 | 0 | 0 | 0 | 0 | 0 | 0 | 0 |
| PISR | 10,000 | 20,000 | 30,000 | 40,000 | 50,000 | 60,000 | 70,000 | 80,000 |
| Relevant Rate (LIBOR) | 5.2500% | 5.2500% | 5.2500% | 5.2500% | 5.2500% | 5.2500% | 5.2500% | 5.2500% |
| N Days | 30 | 30 | 30 | 30 | 30 | 30 | 30 | 30 |
| Interest Shortfall Annex | | | | | | | | |
| AAP | 129,791.67 | 129,791.67 | 129,791.67 | 129,791.67 | 129,791.67 | 129,791.67 | 129,791.67 | 129,791.67 |
| ALP | 0% | 0% | 0% | 0% | 0% | 0% | 0% | 0% |
| OPP | 100% | 100% | 100% | 100% | 100% | 100% | 100% | 100% |
| OTW 1 | 5% | 5% | 5% | 5% | 5% | 5% | 5% | 5% |
| OTW 2 | 6% | 6% | 6% | 6% | 6% | 6% | 6% | 6% |
| OTW 3 | 6% | 6% | 6% | 6% | 6% | 6% | 6% | 6% |
| OTW 4 | 8% | 8% | 8% | 8% | 8% | 8% | 8% | 8% |
| OTW 5 | 75% | 75% | 75% | 75% | 75% | 75% | 75% | 75% |
| FA 1 | 81,041.67 | 81,041.67 | 81,041.67 | 81,041.67 | 81,041.67 | 81,041.67 | 81,041.67 | 81,041.67 |
| FA 2 | 20,000 | 20,000 | 20,000 | 20,000 | 20,000 | 20,000 | 20,000 | 20,000 |
| FA 3 | 10,000 | 10,000 | 10,000 | 10,000 | 10,000 | 10,000 | 10,000 | 10,000 |
| FA 4 | 5,000 | 5,000 | 5,000 | 5,000 | 5,000 | 5,000 | 5,000 | 5,000 |
| FA 5 | 13,750 | 13,750 | 13,750 | 13,750 | 13,750 | 13,750 | 13,750 | 13,750 |
| IIS 1 | 0 | 0 | 0 | 0 | 0 | 0 | 0 | 0 |
| IIS 2 | 0 | 0 | 0 | 0 | 0 | 0 | 0 | 0 |
| IIS 3 | 0 | 0 | 0 | 0 | 0 | 0 | 0 | 0 |
| IIS 4 | 0 | 0 | 0 | 0 | 0 | 0 | 0 | 0 |
| IIS 5 | 0 | 0 | 0 | 0 | 0 | 0 | 0 | 0 |

Fig 6B

Summary of Interest Shortfall Calculations (cont'd.)

|  | Period 21 | Period 22 | Period 23 | Period 24 | Period 25 | Period 26 | Period 27 | Period 28 |
|---|---|---|---|---|---|---|---|---|
| IISR 1 | 0 | 0 | 0 | 0 | 0 | 0 | 0 | 0 |
| IISR 2 | 0 | 0 | 0 | 0 | 0 | 0 | 9,306.84 | 79,633.39 |
| IISR 3 | 0 | 0 | 0 | 0 | 0 | 45,149.83 | 60,254.90 | 364.04 |
| IISR 4 | 0 | 0 | 0 | 0 | 32,373.54 | 14,696.34 | 73.48 | 0.37 |
| IISR 5 | 10,000 | 20,000 | 30,000 | 40,000 | 17,546.48 | 79.98 | 0.36 | 0 |
|  |  |  |  |  |  |  |  |  |
| ISCF 1 | 102.06% | 102.06% | 102.06% | 102.06% | 102.06% | 102.06% | 102.06% | 102.06% |
| ISCF 2 | 100.77% | 100.77% | 100.77% | 100.77% | 100.77% | 100.77% | 100.77% | 100.77% |
| ISCF 3 | 100.60% | 100.60% | 100.60% | 100.60% | 100.60% | 100.60% | 100.60% | 100.60% |
| ISCF 4 | 100.50% | 100.50% | 100.50% | 100.50% | 100.50% | 100.50% | 100.50% | 100.50% |
| ISCF 5 | 100.46% | 100.46% | 100.46% | 100.46% | 100.46% | 100.46% | 100.46% | 100.46% |
|  |  |  |  |  |  |  |  |  |
| CIIS 1 | 1,605,372.97 | 1,638,416.90 | 1,672,140.98 | 1,706,559.22 | 1,741,685.89 | 1,777,535.59 | 1,814,123.20 | 1,851,463.90 |
| CIIS 2 | 239,130.59 | 240,973.88 | 242,831.39 | 244,703.22 | 246,589.47 | 248,490.26 | 241,098.86 | 163,323.95 |
| CIIS 3 | 102,277.54 | 102,895.47 | 103,517.13 | 104,142.54 | 104,771.74 | 60,254.90 | 364.04 | 2.20 |
| CIIS 4 | 46,140.13 | 46,370.83 | 46,602.69 | 46,835.70 | 14,696.34 | 73.48 | 0.37 | 0 |
| CIIS 5 | 106,404.26 | 86,889.28 | 57,285.35 | 17,546.48 | 79.98 | 0.36 | 0 | 0 |

Fig 6C

Summary of Interest Shortfall Calculations (cont'd.)

| | Period 29 | Period 30 | Period 31 | Period 32 | Period 33 | Period 34 | Period 35 |
|---|---|---|---|---|---|---|---|
| Principal | | | | | | | |
| Principal Payments | 0 | 0 | 0 | 0 | 0 | 0 | 0 |
| Writedown | 0 | 0 | 0 | 0 | 0 | 0 | 0 |
| Writedown Reimbursement | 0 | 0 | 0 | 0 | 0 | 0 | 0 |
| Principal Shortfall | 0 | 0 | 0 | 0 | 0 | 0 | 0 |
| PSR | 0 | 0 | 0 | 0 | 0 | 0 | 0 |
| PPL | 0 | 0 | 0 | 0 | 0 | 0 | 0 |
| APL | 0 | 0 | 0 | 0 | 0 | 0 | 0 |
| PPR | 0 | 0 | 0 | 0 | 0 | 0 | 0 |
| OPS | 100M | 100M | 100M | 100M | 100M | 100M | 100M |
| Interest | | | | | | | |
| ISA | 0 | 0 | 0 | 0 | 0 | 0 | 0 |
| ISRA | 90,000 | 100,000 | 110,000 | 120,000 | 129,791.67 | 129,791.67 | 129,791.67 |
| PIS | 0 | 0 | 0 | 0 | 0 | 0 | 0 |
| PISR | 90,000 | 100,000 | 110,000 | 120,000 | 129,791.67 | 129,791.67 | 129,791.67 |
| Relevant Rate (LIBOR) | 5.2500% | 5.2500% | 5.2500% | 5.2500% | 5.2500% | 5.2500% | 5.2500% |
| N Days | 30 | 30 | 30 | 30 | 30 | 30 | 30 |
| Interest Shortfall Annex | | | | | | | |
| AAP | 129,791.67 | 129,791.67 | 129,791.67 | 129,791.67 | 129,791.67 | 129,791.67 | 129,791.67 |
| ALP | 0% | 0% | 0% | 0% | 0% | 0% | 0% |
| OPP | 100% | 100% | 100% | 100% | 100% | 100% | 100% |
| OTW 1 | 5% | 5% | 5% | 5% | 5% | 5% | 5% |
| OTW 2 | 6% | 6% | 6% | 6% | 6% | 6% | 6% |
| OTW 3 | 6% | 6% | 6% | 6% | 6% | 6% | 6% |
| OTW 4 | 8% | 8% | 8% | 8% | 8% | 8% | 8% |
| OTW 5 | 75% | 75% | 75% | 75% | 75% | 75% | 75% |
| FA 1 | 81,041.67 | 81,041.67 | 81,041.67 | 81,041.67 | 81,041.67 | 81,041.67 | 81,041.67 |
| FA 2 | 20,000 | 20,000 | 20,000 | 20,000 | 20,000 | 20,000 | 20,000 |
| FA 3 | 10,000 | 10,000 | 10,000 | 10,000 | 10,000 | 10,000 | 10,000 |
| FA 4 | 5,000 | 5,000 | 5,000 | 5,000 | 5,000 | 5,000 | 5,000 |
| FA 5 | 13,750 | 13,750 | 13,750 | 13,750 | 13,750 | 13,750 | 13,750 |
| IIS 1 | 0 | 0 | 0 | 0 | 0 | 0 | 0 |
| IIS 2 | 0 | 0 | 0 | 0 | 0 | 0 | 0 |
| IIS 3 | 0 | 0 | 0 | 0 | 0 | 0 | 0 |
| IIS 4 | 0 | 0 | 0 | 0 | 0 | 0 | 0 |
| IIS 5 | 0 | 0 | 0 | 0 | 0 | 0 | 0 |

Fig 6D

Summary of Interest Shortfall Calculations (cont'd.)

| | Period 29 | Period 30 | Period 31 | Period 32 | Period 33 | Period 34 | Period 35 |
|---|---|---|---|---|---|---|---|
| IISR 1 | 0 | 24,830.94 | 109,420.64 | 119,995.53 | 129,791.64 | 129,791.64 | 129,791.64 |
| IISR 2 | 89,997.79 | 74,585.12 | 574.93 | 4.43 | 0.03 | 0 | 0 |
| IISR 3 | 2.20 | 0.01 | 0 | 0 | 0 | 0 | 0 |
| IISR 4 | 0 | 0 | 0 | 0 | 0 | 0 | 0 |
| IISR 5 | 0 | 0 | 0 | 0 | 0 | 0 | 0 |
| ISCF 1 | 102.06% | 102.06% | 102.06% | 102.06% | 102.06% | 102.06% | 102.06% |
| ISCF 2 | 100.77% | 100.77% | 100.77% | 100.77% | 100.77% | 100.77% | 100.77% |
| ISCF 3 | 100.60% | 100.60% | 100.60% | 100.60% | 100.60% | 100.60% | 100.60% |
| ISCF 4 | 100.50% | 100.50% | 100.50% | 100.50% | 100.50% | 100.50% | 100.50% |
| ISCF 5 | 100.46% | 100.46% | 100.46% | 100.46% | 100.46% | 100.46% | 100.46% |
| CIIS 1 | 1,889,573.20 | 1,903,626.97 | 1,833,389.32 | 1,751,131.05 | 1,657,383.53 | 1,561,706.34 | 1,464,059.79 |
| CIIS 2 | 74,585.12 | 574.93 | 4.43 | 0.03 | 0 | 0 | 0 |
| CIIS 3 | 0.01 | 0 | 0 | 0 | 0 | 0 | 0 |
| CIIS 4 | 0 | 0 | 0 | 0 | 0 | 0 | 0 |
| CIIS 5 | 0 | 0 | 0 | 0 | 0 | 0 | 0 |

METHOD FOR EXECUTING A SINGLE TRANCHE SYNTHETIC ABS DERIVATIVE TRANSACTION

PRIORITY APPLICATION

This application is a divisional of U.S. application Ser. No. 11/854,922, filed Sep. 13, 2007, which claims the benefit of U.S. Provisional Patent Application No. 60/842,796, filed Sep. 6, 2006, titled Single Tranche Synthetic ABS Transaction. The entire contents of both applications are incorporated herein by reference.

INTRODUCTION

Methods and specifications are described herein for executing single tranche synthetic asset backed securities (ABS) derivative transactions. The synthetic ABS market has experienced exponential growth following (i) the publication of standard ISDA documentation for single name ABS CDS transactions, and (ii) the launch of the ABX credit index and execution of derivative transactions thereon. Single tranche products are one of the next stages in the evolution of the synthetic ABS space.

A Single Tranche Synthetic ABS product is generally a derivative instrument that is designed to replicate certain economics returns of structured finance collateralized debt obligations (SF CDO) securities. Single tranche synthetic ABS products can allow parties to express a leveraged and/or correlation view on a custom ABS portfolio by transferring a credit risk of a particular transacted tranche of a portfolio in swap format—in essence, providing a synthetic securitization of securitized assets. Since the transaction is provided in swap format, a security need not be issued in connection with the transaction. Several advantages single tranche products have over conventional SF CDO securities include, for example, (i) superior leverage—there is no cost of funds hurdle, (ii) flexibility—portfolios can be customized and removing the need to place an entire capital structure, (iii) efficiency—minimal execution time and no fixed costs such as SPVs fees and trustee expenses, and (iv) other advantages. Single tranche products may be used in many applications, including as a substitute for SF CDO securities, or as a hedge to related cash position. Although the inventions described herein refer specifically to single tranche synthetic ABS products, it will be understood to one of skill in the art that the same calculations, formulae and other overarching concepts can be applied to other transactions and instruments.

Improvements to single tranche products in the market are described herein which, among other advantages, minimize basis risk when hedged with a standard untranched portfolio ABS CDS trade.

In one embodiment of the invention, a method is provided that comprises providing a single tranche derivative transaction, wherein the derivative transaction relates to a reference portfolio, and wherein the single tranche derivative transaction relates to a single transacted tranche within a capital structure including a plurality of reference tranches; allocating an available funds cap risk in the reference portfolio in reverse sequence, the reverse sequence beginning with a most subordinate reference tranche; determining an incurred interest shortfall amount for each of the reference tranches; allocating one or more interest shortfall reimbursements sequentially beginning with a most senior reference tranche that has incurred an interest shortfall and ending with a subordinate tranche; and determining an incurred interest shortfall reimbursement amount for each of the reference tranches. Other features of the invention include that an available funds cap risk in the single tranche derivative transaction on an ABS portfolio is equivalent to a hypothetical sequential-pay cashflow securitization structure based on the same ABS portfolio.

In another embodiment, a method is provided that comprises providing a single tranche derivative transaction, wherein the derivative transaction relates to a reference portfolio, and wherein the single tranche derivative transaction relates to a single transacted tranche within a capital structure including a plurality of reference tranches, including at least a transacted tranche, a mezzanine tranche, a senior tranche, and an equity tranche; allocating a portfolio premium for the reference portfolio in a manner equivalent to distributing periodic income in a hypothetical sequential-pay cashflow securitization structure; and applying a sequential allocation of the premium payment in the capital structure and determining premium payments for the transacted tranche and each reference tranche within the capital structure. Other features of the invention include that a premium is paid in an impaired equity tranche despite full or partial impairment.

In another embodiment of the invention, a method is provided that comprises: providing a single tranche derivative transaction, wherein the derivative transaction relates to a reference portfolio, and wherein the single tranche derivative transaction relates to a single transacted tranche within a capital structure containing a plurality of reference tranches; determining a level of impairment of each of the plurality of reference tranches following an occurrence of a principal loss in the reference portfolio; allocating said principal loss in a reverse sequence among the plurality of reference tranches beginning with a most subordinate tranche; determining an amount of notional principal to restore each of the plurality of reference tranches following an occurrence of a principal shortfall reimbursement or a writedown reimbursement in the reference portfolio; allocating said principal shortfall reimbursement or writedown reimbursement in sequence among the plurality of reference tranches beginning with a most senior tranche that has been impaired and ending with a most subordinate tranche; determining an amount of a principal reduction for each of the plurality of reference tranches following a principal payment in the reference portfolio; allocating the principal payment in sequence among the plurality of reference tranches beginning with the most senior tranche and ending with the most subordinate tranche, and determining an outstanding tranche notional amount of the transacted tranche and each of the plurality of reference tranches based on the allocation of principal losses, principal shortfall reimbursements, writedown reimbursements, and principal payments.

BRIEF DESCRIPTION OF THE DRAWINGS

FIG. 2 depicts a sample matrix of a synthetic capital structure for a single tranche transaction according to an embodiment of the invention;

FIG. 4 depicts a table of calculations for principal shortfalls according to an embodiment of the invention;

Figure 5A:
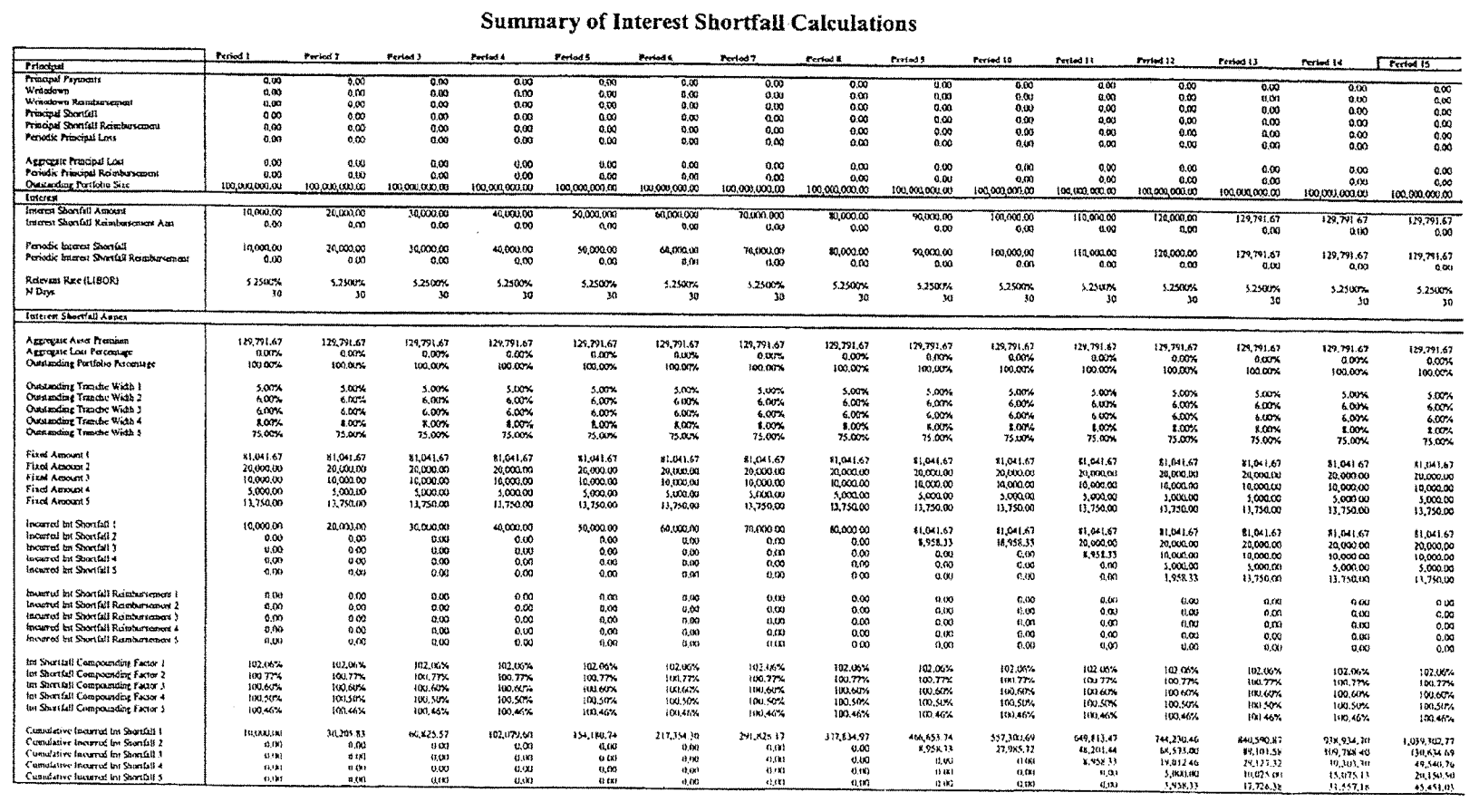

FIGS. 5A-5E depict a table of calculations of interest shortfalls according to an embodiment of the invention;

Figure 6A:
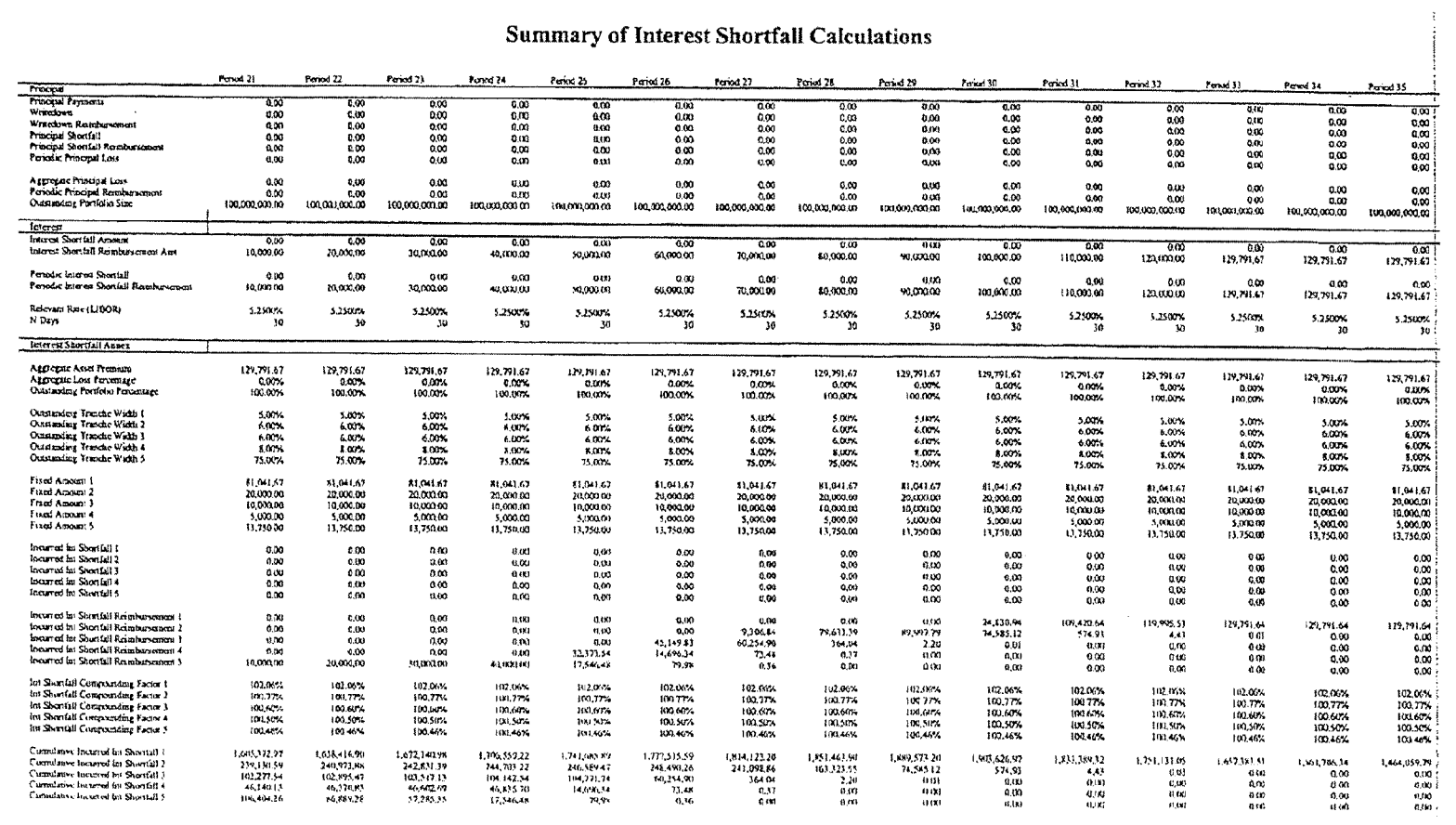

FIGS. 6A-6E depict a table of calculations of interest shortfall reimbursements according to an embodiment of the invention.

DETAILED DESCRIPTION

Single tranche derivative transactions represent an intersection of derivative and securitization technologies. In general, a single tranche derivative transaction is a synthetic securitization of credit default swaps (CDS). The underlying CDS for this particular single tranche derivative transaction has 'pay-as-you-go' (PAUG) settlement. The use of PAUG settlement is generally limited to asset classes such as ABS, Commercial Mortgage Backed Securities (CMBS), CDO securities, and other securitized products. In CDS with PAUG settlement, conventional credit events such as bankruptcy, restructuring and failure to pay are replaced with credit events that are usually directly linked to differences between actual and expected cashflows of a reference obligation. Such credit events include principal shortfalls, writedowns, and interest shortfalls. In general, a reference portfolio is agreed to by the counterparties in the credit derivative transaction and comprised of fixed income securities including but not limited to corporate bonds/loans, ABS, CMBS, and CDO securities.

Conventional credit derivative transactions referencing corporate issuers generally have (i) a fixed tenor (a tenor is the term or life of a contract) and a notional (which is a nominal amount underlying a derivatives contract), and (ii) cash or physical settlement with respect to the entire transaction following a single credit event. In contrast, credit derivative transactions with PAUG settlement have (i) a tenor and notional linked to the respective maturity and outstanding principal of a specific obligation, and (ii) PAUG settlement payments are directly linked to losses on a specific obligation and recoveries, reimbursements or other payments on such losses are passed through. Given the complexity of the underlying derivative, applying securitization technology on this class of credit derivative represents a challenging structuring endeavor.

The securitization framework applied to a single tranche synthetic ABS product described herein is that of a sequential pay structure. Sequential pay entails that interest and principal collections are distributed from the top of a capital structure to the bottom; as a result, losses on the portfolio thereby sustained from bottom to the top.

Figure 1:
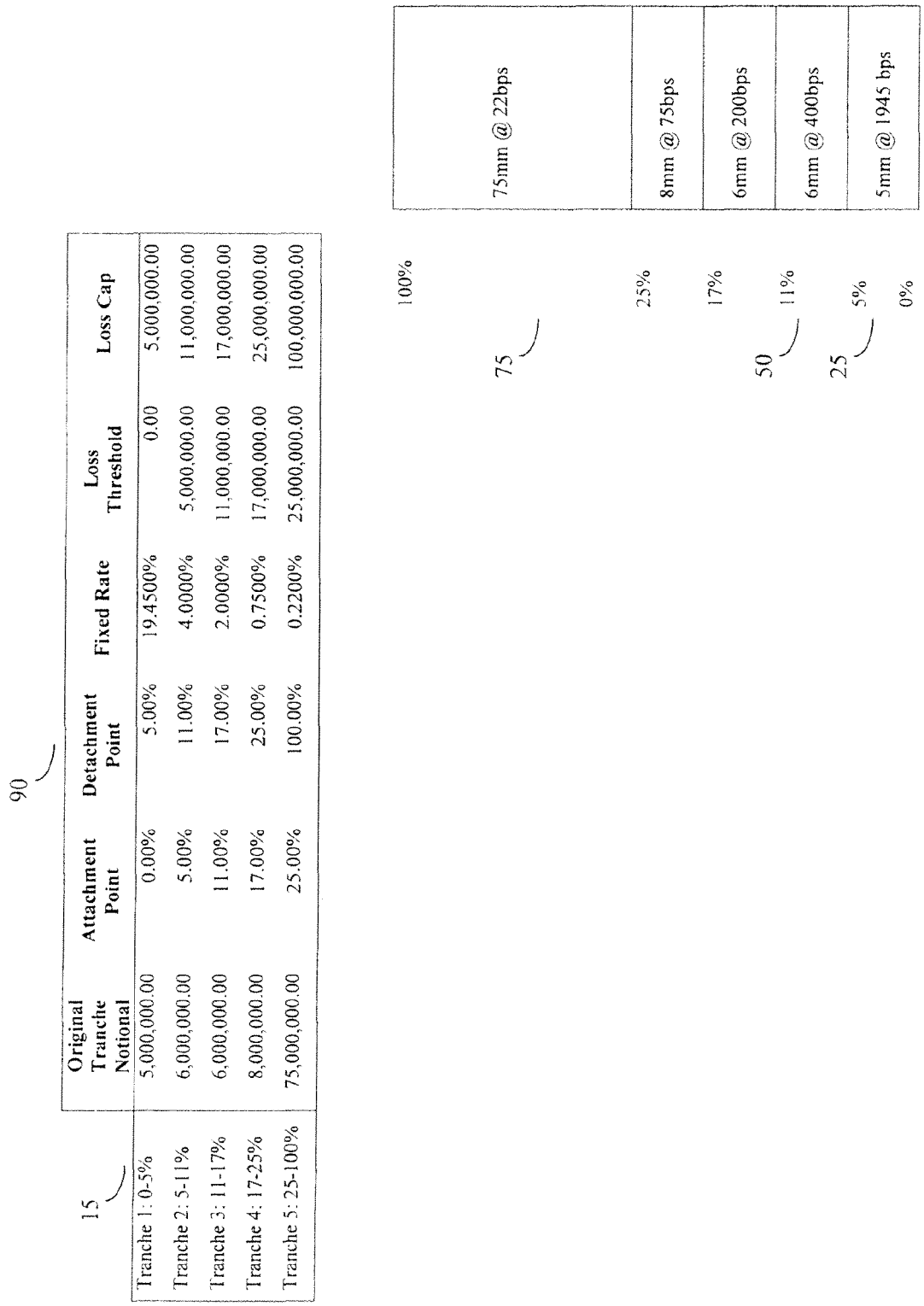
FIG. 1 depicts a diagram of a sample synthetic capital structure for a single tranche transaction according to an embodiment of the invention.

One example of a capital structure is provided in FIG. 1. As shown, a capital structure can have a plurality of tranches, such as five tranches 15, which can have specified characteristics 90, such as a notional, attachment point, detachment point, fixed rate, loss threshold, loss cap, or other characteristics. Among the five tranches, there is an equity tranche (25), one or more mezzanine/senior tranches (50), and a super senior tranche 75.

A translation of sequential pay structure to the single tranche derivative context would entail the following:

(i) A portfolio premium is typically allocated sequentially through the capital structure (e.g., from a senior tranche to a subordinate tranche). Although there may be a stated accrual rate for each reference tranche in the capital structure, a tranche swap premium is typically capped at a remaining portfolio swap premium after subtracting the swap premium paid to each senior reference tranche. In general, a credit protection buyer pays the credit protection seller such tranche swap premium periodically.

(ii) Principal payments are generally allocated in sequence (e.g., from a senior most tranche to the subordinate tranches), and net principal losses are allocated in reverse sequence (e.g., from a subordinate tranche to the senior tranches). Net principal reimbursement are allocated in sequence beginning with the most senior tranche to have been previously impaired, then to a subordinate tranche. (An impaired tranche is one that has incurred a principal loss in the form of a principal shortfall or writedown.) If the net change causes a reference tranche to be impaired (or further impaired), the credit protection seller makes a payment to the credit protection buyer. If the net change causes the reference tranche notional to be reinstated (in part or in full), the credit protection buyer makes a payment to the credit protection seller.

Figure 3:
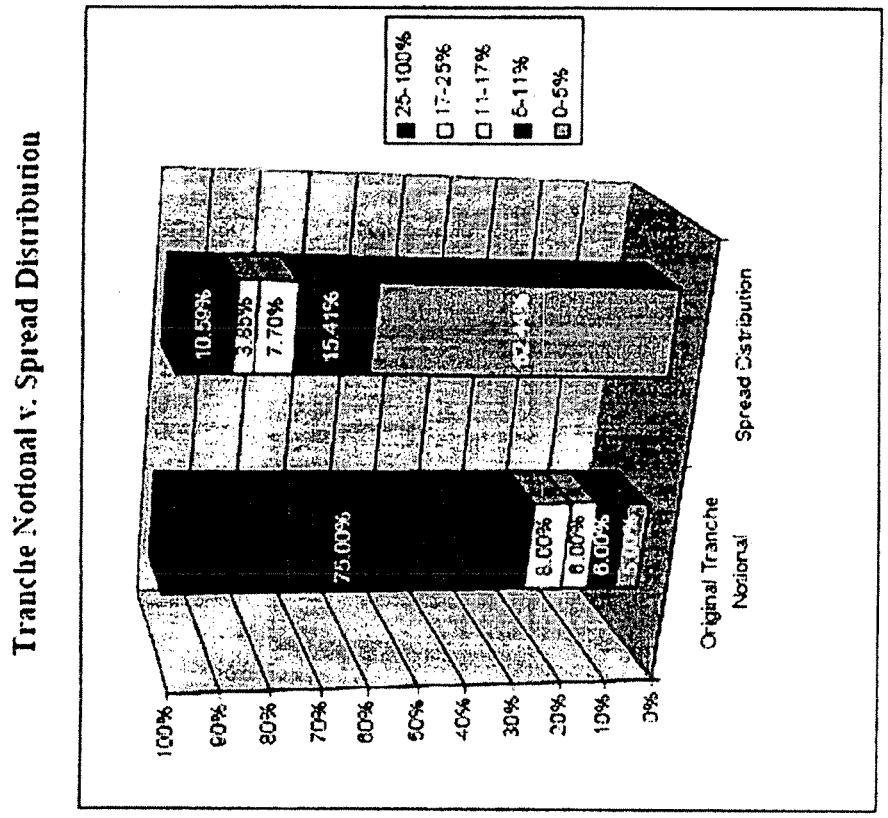
FIG. 3 depicts a chart of a comparison of a sample capital structure and spread distribution according to an embodiment of the invention.

(iii) A net interest shortfall is typically allocated in reverse sequence (e.g., beginning with a subordinate tranche to the senior tranches). Net interest shortfall reimbursements are allocated in sequence beginning with the most senior reference tranche to have suffered an incurred interest shortfall then to a subordinate tranche. The allocations of interest shortfalls are usually based on a distribution of interest income/swap premium within the capital structure rather than the principal attachment/detachment points. As illustrated in FIG. 3, which compares capital structure and corresponding spread distribution, there are typically disparities between distribution of the risk of principal loss and available funds cap risk across the capital structure.

In general, a credit protection seller may not be required to make an interest/principal shortfall payment on a particular tranche unless the net periodic interest shortfall exceeds the sum of the swap premium of each subordinate reference tranche; and the amount paid is usually capped at the amount of the swap premium of such tranche. The credit protection buyer is typically not required to make a reimbursement payment unless a net periodic interest shortfall reimbursement exceeds the sum of the cumulative interest shortfall amount paid under each senior reference tranche (which may be increased by compound interest); the amount paid may be capped at the cumulative interest shortfall amounts paid in respect of such tranche (as increased by compound interest).

One of the significant improvements with respect to single tranche products described herein over other single tranche products in the market is the transaction accounts for the available funds cap risk (AFC risk) of the ABS securities within the underlying portfolio and does so in a manner equivalent to a cash analog based on the same underlying portfolio with sequential pay structure. Note that AFC risk is expressed in the form of interest shortfall amounts in the related CDS with PAUG settlement. Due to the complexities involved in engineering/structuring a derivative transaction with these features as detailed above, single tranche products in the market typically do not address AFC risk or address it in a very limited manner.

The development of such a single tranche product provides substantial benefits to both derivative dealers and customers. For dealers, among other advantages, it minimizes basis risk between the single tranche transaction and related single name ABS CDS hedges (which do typically account for AFC risk). For customers, the single tranche product becomes a perfect substitute for certain SF CDO securities with all the aforementioned advantages of derivatives over cash bonds.

This technology and inventions described herein may be applied to other asset classes (e.g. CMBS, SF CDOs.) in respect of which the related derivatives trade with 'pay-as you go' settlement or other settlement methods.

Swap Premium

A swap premium may be allocated sequentially through a capital structure in order beginning with a senior-most tranche to the subordinate tranches. Although there may be a stated accrual rate for each reference tranche in the capital structure, the swap premium for a particular tranche is capped at the remaining portfolio swap premium after subtracting the swap premium paid to a senior reference tranche.

A swap premium of a mezzanine and senior tranche may be calculated as the lesser of (i) a product of a fixed rate of such tranche and an outstanding tranche notional, and (ii) the aggregate portfolio premium net of premium payments allocated to each senior reference tranche, using the formula:

$$\left[\left(OTNA_{n,t} * FR_n * \frac{ACT}{360}\right), \max\left(AAP - \sum_{n+1}^{m} RFA_t, 0\right)\right].$$

The swap premium of an equity tranche may be calculated as the aggregate portfolio premium net of premium payments allocated to each senior reference tranche, using the formula:

$$\max\left(AAP - \sum_{n+1}^{m} FA_t, 0\right).$$

Using such formulas to calculate a swap premium allows, among other things, a fully (or partially) impaired equity tranche to receive periodic premium payments despite full (or substantially full) principal loss.

Principal

Principal payments are typically allocated in sequence beginning with the senior-most tranche to the subordinate tranches. The outstanding tranche notional amount of a tranche is calculated based on an original notional, incurred principal losses, incurred principal reimbursements, the excess of aggregate principal payments on the reference portfolio over the initial portfolio size less the loss cap, using the formula:

$$\max[(OTN_n * ITF_n) - \Sigma IPL_n + \Sigma IPR_n - \max(\Sigma PP - IPS + LC_n, 0), 0].$$

Principal losses are typically allocated in the capital structure in a reverse sequence beginning with the most subordinate tranche to the senior tranches. Incurred principal losses with respect to a tranche may be calculated as an amount equal to the lesser of: (i) aggregate periodic principal losses minus aggregate periodic principal reimbursements (subject to a minimum of zero); and (ii) the aggregate principal loss amount minus the principal loss threshold of such tranche, (subject to a minimum of zero); and (iii) the outstanding tranche notional amount of such tranche from the previous accrual period, using the formula:

$$\min(\max(PPL_t - PPR_t, 0), \max(APL_t - LT_n), OTNA_{t-1}).$$

Principal reimbursements are typically allocated in a sequence beginning with the most senior tranche to have been previously impaired prior to a payment date. Generally, an incurred principal reimbursement amount with respect to a tranche is calculated based on the lesser of: (i), aggregate periodic principal reimbursement amounts, minus aggregate periodic principal loss amounts, minus, the excess of aggregate principal losses over the loss cap; and, (ii) the difference of sum of all incurred principal losses as of the current accrual period and the sum of all incurred principal reimbursements as of the prior accrual period, using the formula:

$$\min(\max(PPR_t - PPL_t - \max(APL_{t-1} - LC_i, 0), 0), \max(\Sigma IPL_t - \Sigma IPR_{t-1}, 0))$$

If a net change in principal, or other measurement of a reference tranche causes the transacted or reference tranche to be impaired (or further impaired), a credit protection seller may make a payment to a credit protection buyer that equals the incurred principal loss (using, for example, the above formula). If the net change causes the reference tranche notional to be reinstated or restored (in part or in full), the credit protection buyer may make a payment to the credit protection seller equal to an incurred principal reimbursement (using, for example, the above formula). Examples of calculations of principal shortfall calculations for a particular tranche of the capital structure are shown in FIG. 4.

Interest Shortfalls

Typically, interest shortfalls are allocated in a reverse sequence beginning with the most subordinate reference tranche. To the extent that a shortfall exists, under a single tranche transaction, a credit protection seller would not be required to make an interest shortfall payment unless a net interest shortfall for a particular period exceeds a certain interest shortfall threshold and such interest shortfall payment may also be subject to an interest shortfall cap, such amount, an incurred interest shortfall amount.

The incurred interest shortfall amount for the transacted tranche may be calculated as a lesser of (i) a net periodic interest shortfall less the interest shortfall threshold, and (ii) the interest shortfall cap, using the formula:

$$\min(\max(PIS_t - PISR_t - IST_{n,t}, 0), ISC_{n,t}).$$

The incurred interest shortfall amount for each reference tranche may be calculated as a lesser of (i) a net periodic interest shortfall less an aggregate periodic premium payment of each subordinate reference tranche, and (ii) the periodic premium payment of such reference tranche, using the formula:

$$\min\left(\max\left(PIS_t - PISR_t - \sum_{0}^{i-1} RFA_t, 0\right), RFA_{i,t}\right).$$

The inputs required to determine the incurred interest shortfalls include the following which may be calculated using the representative formulas:

$$\text{Interest Shortfall Threshold} = \sum_{0}^{n-1} RFA_t.$$

Reference Tranche Fixed Amounts $$\min\left[\left(S_i * OTW_i * IPS * \frac{ACT}{260}\right), \max\left(AAP_t - \sum_{i+1}^{m} RFA_t, 0\right)\right].$$

The inputs required to determine the reference tranche fixed amounts include the following which may be calculated using the representative formulas:

$$\text{outstanding tranche width} = \max[\min(OPP, X_{i+1}) - \max(X_i, ALP), 0]$$

$$\text{aggregate asset premium} = PRS * OPS_t * \frac{ACT}{360}$$

Interest Shortfall Reimbursements

Interest shortfall reimbursements may be allocated in sequence beginning with a most senior reference tranche to have suffered an incurred interest shortfall prior to such payment date. A credit protection buyer may not be required to make a reimbursement payment unless or until a net interest shortfall reimbursement for a particular period is greater than the incurred interest shortfall amount. Payments in respect of interest reimbursement typically do not exceed a cumulative incurred interest shortfall of a reference/transacted tranche. To simulate the effect of deferred or defaulted interest within hypothetical securitization structure, cumulative incurred interest shortfalls for each tranche are increased by compounded interest each accrual period they remain unreimbursed Incurred interest shortfall reimbursement amount for the transacted tranche calculated as a lesser of (i) the net periodic interest shortfall reimbursement less a cumulative excess interest shortfall amount, and (ii) a product of the cumulative incurred interest shortfall from the previous period and a compounding factor of the transacted tranche, using the formula:

$$\min(\max(PISR_t - PIS_t - CEIS_{n,t}, 0), CIIS_{n,t-1} * ISCF_{n,t}).$$

Incurred interest shortfall reimbursement amount for a reference tranche is calculated as a lesser of (i) a net periodic interest shortfall reimbursement less a cumulative excess interest shortfall amount of each reference tranche, and (ii) a product of a cumulative incurred interest shortfall of each reference tranche from a prior period and a compounding factor of such tranche, using the formula:

$$\min\left(\max\left(PISR_t - PIS_t - \sum_{i+1}^{m}(RCIIS_{t-1} * RISCF_t), 0\right), RCIIS_{i,t-1} * RISCF_{i,t}\right).$$

The inputs required to determine the incurred interest shortfalls include the following which may be calculated using the representative formulas:

$$\text{Cumulative Excess Interest Shortfall Amount} = \sum_{n+1}^{m} RCIIS_t.$$

Cumulative Incurred Interest Shortfall Amount for the transacted tranche =

$$IIS_{n,t} - IISR_{n,t} + (CIIS_{n,t-1} * ISCF_{n,t})$$

Cumulative Incurred Interest Shortfall Amount for a reference =

$$RIIS_{i,t} - RIISR_{i,t} + (RCIIS_{i,t-1} * RISCF_{i,t})$$

$$\text{Compounding Factor} = 100\% + (FR_n + LIBOR_t) * \frac{ACT}{360}$$

$$\text{Reference Tranche Compounding Factor} = 100\% + (S_i + LIBOR_t) * \frac{ACT}{360}$$

An exemplary embodiment of the transaction is described in termsheet attached as Appendix A according to the following terms and conditions for a single tranche synthetic ABS transaction. A swap confirmation template utilized by derivative counterparties in connection with the execution of this single tranche synthetic ABS transaction is attached as Appendix B.

It will be appreciated that the present invention has been described by way of example only, and that improvements and modifications may be made to the invention without departing from the scope or spirit thereof.

APPENDIX A

| Single Tranche Synthetic ABS Transaction Indicative Terms and Conditions | |
|---|---|
| Portfolio: | As specified in Annex B. |
| Party A: | LB |
| Party B: | [ ] |
| Trade Date: | [ ] |
| Effective Date: | [ ] |
| Scheduled Termination Date: | [ ] |
| Termination Date: | The day falling one year after the date upon which the Outstanding Portfolio Size is reduced to zero; unless, the Outstanding Portfolio Size is increased to an amount greater than zero within such year. |
| Floating Rate Payer: | Party [A] [B] ("Buyer") |
| Fixed Rate Payer: | Party [A] [B] ("Seller") |
| Calculation Agent: | Party A |
| Fixed Rate (FR): | [ ]% |
| Fixed Amount (FA): | $\min\left[\left(OTNA_{n,t} * FR_n * \frac{ACT}{360}\right), \max\left(AAP - \sum_{n+1}^{m} RFA_t, 0\right)\right]$ |
| Aggregate Asset Premium (AAP) | $PRS * OPS_t * \frac{ACT}{360}$ |
| Detachment Point (DP): | [ ]% |
| Attachment Point (AP): | [ ]% |
| Weighting (W): | [ ]% |
| Original Tranche Notional (OTN): | USD [ ] |
| Initial Tranche Factor (ITF): | [ ]% |
| Outstanding Tranche Notional Amount (OTNA): | |
| Initial Portfolio Size (IPS): | $\dfrac{OTN_n}{DP_n - AP_n}$ |
| Outstanding Portfolio Size (OPS): | $\Sigma RONA_t$ |
| Loss Threshold (LT): | $AP_n * IPS$ |
| Loss Cap (LC): | $DP_n * IPS$ |

APPENDIX A-continued

Single Tranche Synthetic ABS Transaction
Indicative Terms and Conditions

| | |
|---|---|
| Reference Obligation Notional Amount (RONA): | For each Ref Ob, (IPS*W*Initial Factor) − ΣPP − ΣPL + ΣPR |
| Interest Shortfalls (IS): | Interest Shortfall Amounts |
| Interest Shortfall Reimbursements (ISR) | Interest Shortfall Reimbursement Amounts |
| Principal Payment (PP) | Principal Payment Amounts |
| Principal Loss (PL): | Writedown Amounts, Principal Shortfall Amounts |
| Principal Reimbursement (PR): | Writedown Reimbursement Amounts, Principal Shortfall Reimbursement Amounts |
| Settlement Method: | |
| Incurred Interest Shortfalls (IIS) | $\min(\max(PIS_t - PISR_t - IST_{n,t}, 0), ISC_{n,t})$ |
| Periodic Interest Shortfalls (PIS) | $\Sigma IS_t$ |
| Cumulative Incurred Interest Shortfalls (CIIS) | $= IIS_{n,t} - IISR_{n,t} + (CIIS_{n,t-1} * ISCF_{n,t})$ |
| Interest Shortfall Compounding Factor (ISCF) | $100\% + \left((FR_n + LIBOR_t) * \dfrac{ACT}{360}\right)$ |
| Interest Shortfall Threshold (IST) | As set forth in Annex A |
| Interest Shortfall Cap (ISC) | $RFA_{n,t}$ |
| Incurred Interest Shortfall Reimbursements (IISR) | $\min(\max(PISR_t - PIS_t - CEIS_{n,t}, 0), CIIS_{n,t-1} * ISCF_{n,t})$ |
| Periodic Interest Shortfall Reimbursements (PISR) | $\Sigma ISR_t$ |
| Cumulative Excess Interest Shortfalls (CEIS) | As set forth in Annex A |
| Incurred Principal Losses (IPL) | $\min(\max(PPL_t - PPR_t, 0), \max(APL_t - LT_n), OTNA_{t-1})$ |
| Periodic Principal Losses (PPL) | $\Sigma PL_t$ |
| Aggregate Principal Losses (APL) | $\max(\Sigma PL - \Sigma PR, 0)$ |
| Incurred Principal Reimbursements (IPR) | $\min(\max(PPR_t - PPL_t - \max(APL_{t-1} - LC_i, 0), 0), \max(\Sigma IPL_t - \Sigma IPR_{t-1}, 0))$ |
| Periodic Principal Reimbursements (PPR) | $\Sigma PR_t$ |

$_t$ = an amount in respect of a specific accrual period.

Annex A

| Reference Tranche | Reference Spread | Lower Strike | Upper Strike |
|---|---|---|---|
| 1 | $S_1$ = [ ]% | $X_1$ = [0]% | $X_2$ = [ ]% |
| 2 | $S_2$ = [ ]% | $X_2$ = [ ]% | $X_3$ = [ ]% |
| 3 | $S_3$ = [ ]% | $X_3$ = [ ]% | $X_4$ = [ ]% |
| 4 | $S_4$ = [ ]% | $X_4$ = [ ]% | $X_5$ = [ ]% |
| 5 | $S_5$ = [ ]% | $X_5$ = [ ]% | $X_6$ = [100]% |

$S_i$ = Reference Tranche Spread
$X_i$ = Reference Tranche Attachment
$X_{i+1}$ = Reference Tranche Detachment

| | |
|---|---|
| Interest Shortfall Threshold (IST) | $\sum_{0}^{n-1} RFA_t$ |
| Aggregate Loss Percentage (ALP) | $\dfrac{APL}{IPS}$ |
| Outstanding Portfolio Percentage (OPP) | $\dfrac{OPS}{IPS} + ALP$ |
| Outstanding Tranche Width (OTW$_i$) | $\max[\min(OPP, X_{i+1}) - \max(X_i, ALP), 0]$ |
| Reference Tranche Fixed Amount (RFA$_i$) | $\min\left[\left(S_i * OTW_i * IPS * \dfrac{ACT}{360}\right), \max\left(AAP_t - \sum_{i+1}^{m} RFA_t, 0\right)\right]$ |

-continued

| | |
|---|---|
| Cumulative Excess Interest Shortfall (CEIS) | $\sum_{n+1}^{m} RCIIS_t$ |
| Reference Tranche Incurred Interest Shortfalls ($RIIS_i$) | $\min\left(\max\left(PIS_t - PISR_t - \sum_{0}^{i-1} RFA_t, 0\right), RFA_{i,t}\right)$ |
| Reference Tranche Incurred Interest Shortfall Reimbursements ($RIISR_i$) | $\min\left(\max\left(PISR_t - PIS_t - \sum_{i+1}^{m}(RCIIS_{t-1} * RISCF_t), 0\right), RCIIS_{i,t-1} * RISCF_{i,t}\right)$ |
| Reference Tranche Interest Shortfall Compounding Factor ($RISCF_i$) | $100\% + (S_i + LIBOR_t) * \frac{ACT}{360}$ |
| Reference Tranche Cumulative Incurred Interest Shortfall ($RCIIS_i$) | $RIIS_{i,t} - RIISR_{i,t} + (RCIIS_{i,t-1} * RISCF_{i,t})$ |

$_t$ = an amount in respect of a specific accrual period

Annex B

Formula Key:

| | |
|---|---|
| (AAP) Aggregate Asset Premium | $PRS * OPS_t * \frac{ACT}{360}$ |
| ALP (Aggregate Loss Percentage) | $\frac{APL}{IPS}$ |
| AP (Attachment Point) | [ ] % |
| APL (Aggregate Principal Losses) | $\max(\Sigma PL - \Sigma PR, 0)$ |
| CEIS (Cumulative Excess Interest Shortfalls) | $\sum_{n+1}^{m} RCIIS_t$ |
| CIIS (Cumulative Incurred Interest Shortfalls) | $IIS_{n,t} - IISR_{n,t} + (CIIS_{n,t-1} * ISCF_{n,t})$ |
| DP (Detachment Point) | [ ] % |
| FR (Fixed Rate) | [ ] % |
| FA (Fixed Amount): | $\min\left[\left(OTNA_{n,t} * FR_n * \frac{ACT}{360}\right), \max\left(AAP - \sum_{n+1}^{m} FA_t, 0\right)\right]$ |
| IIS (Incurred Interest Shortfalls) | $\min(\max(PIS_t - PISR_t - IST_{n,t}, 0), ISC_{n,t})$ |
| IISR (Incurred Interest Shortfall Reimbursements) | $\min(\max(PISR_t - PIS_t - CEIS_{n,t}, 0), CIIS_{n,t-1} * ISCF_{n,t})$ |
| IPL (Incurred Principal Losses) | $\min(\max(PPL_t - PPR_t, 0), \max(APL_t - LT_n), OTNA_{t-1})$ |
| IPR (Incurred Principal Reimbursements) | $\min(\max(PPR_t - PPL_t - \max(APL_{t-1} - LC_i, 0), 0), \max(\Sigma IPL_t - \Sigma IPR_{t-1}, 0))$ |
| IPS (Initial Portfolio Size) | $\frac{OTN_n}{DP_n - AP_n}$ |

Annex B

Formula Key:

| | |
|---|---|
| ISC (Interest Shortfall Cap) | $RFA_{n,t}$ |
| ISCF (Interest Shortfall Compounding Factor) | $100\% + (FR_n + LIBOR_t) * \dfrac{ACT}{360}$ |
| ISR (Interest Shortfall Reimbursements) | [ ] % |
| IST (Interest Shortfall Threshold) | $\sum\limits_{0}^{n-1} RFSA_t$ |
| LC (Loss Cap) | $DP_n * IPS$ |
| LT (Loss Threshold) | $AP_n * IPS$ |
| OTN (Original Tranche Notional) | USD [ ] |
| OTNA (Outstanding Tranche Notional Amount) | |
| OTW (Outstanding Tranche Width) | $\max[\min(OPP, X_{i+1}) - \max(X_i, ALP), 0]$ |
| OPP (Outstanding Portfolio Percentage) | $\dfrac{OPS}{IPS} + ALP$ |
| OPS (Outstanding Portfolio Size) | $\Sigma RONA_t$ |
| PIS (Periodic Interest Shortfalls) | $\Sigma IS_t$ |
| PISR (Periodic Interest Shortfall Reimbursements) | $\Sigma ISR_t$ |
| PL (Principal Loss) | Writedown Amounts, Principal Shortfall Amounts |
| PP (Principal Payments) | Principal Payment Amounts |
| PPL (Periodic Principal Losses) | $\Sigma PL_t$ |
| PPR (Periodic Principal Reimbursements) | $\Sigma PR_t$ |
| PR (Principal Reimbursement) | Writedown Reimbursement Amounts, Principal Shortfall Reimbursement Amounts |
| PRS (Portfolio Reference Spread) | [ ] % |
| RONA (Reference Obligation Notional Amount) | For each Ref Ob, $(IPS * W * Initial\ Factor) - \Sigma PP - \Sigma PL + \Sigma PR$ |
| Reference Tranche Cumulative Incurred Interest Shortfall (RCIIS) | $RIIS_{i,t} - RIISR_{i,t} + (RCIIS_{i,t-1} * RISCF_{i,t})$ |
| Reference Tranche Fixed Amount (RFA) | $\min\left[\left(S_i * OTW_i * IPS * \dfrac{ACT}{360}\right), \max\left(AAP_t - \sum\limits_{i+1}^{m} RFA_t, 0\right)\right]$ |
| Reference Tranche Incurred Interest Shortfalls (RIIS) | $\min\left(\max\left(PIS_t - PISR_t - \sum\limits_{0}^{i-1} RFA_t, 0\right), RFA_{i,t}\right)$ |

-continued

Annex B

Formula Key:

Reference Tranche Incurred Shortfall Reimbursements (RIISR)

$$\min\left(\max\left(PISR_t - PIS_t - \sum_{i+1}^{m}(RCIIS_{t-1} * RISCF_t), 0\right), RCIIS_{i,t-1} * RISCF_{i,t}\right)$$

Reference Tranche Interest Shortfall Compounding Factor (RISCF)

$$100\% + (S_i + LIBOR_t) * \frac{ACT}{360}$$

W (Weighting) [ ]%

APPENDIX B

Transaction

Date:
To: [            ]
From: LB
RE: Single Tranche Credit Derivative Transaction relating to an asset backed Security Portfolio The purpose of this communication (the "Confirmation") is to confirm the terms and conditions of the single tranche Credit Derivative Transaction relating to a portfolio of mortgage-backed securities entered into on the Trade Date specified below (the "Transaction").

The definitions and provisions contained in the 2003 ISDA Credit Derivatives Definitions (the "Credit Derivatives Definitions"), as published by the International Swaps and Derivatives Association, Inc., are incorporated into this Confirmation. In the event of any inconsistency between the Credit Derivatives Definitions and this Confirmation, this Confirmation shall govern.

[This Confirmation supplements, forms a part of, and is subject to, the ISDA Master Agreement, dated as of [date], as amended and supplemented from time to time (the "Agreement"), between LB [Special Financing Inc.] ("Party A") and [ ] ("Party B"). All provisions contained in the Agreement govern this Confirmation except as expressly modified below.]

References in this Confirmation to the "Reference Obligation" shall be to the terms of the Reference Obligation (as defined below) set out in the Underlying Instruments (as defined below) as amended from time to time unless otherwise specified below.

The terms of the Transaction to which this Confirmation relates are as follows:
1. General Terms:
Trade Date: [ ]
Effective Date: [ ]
Scheduled Termination [ ]
Date:
Termination Date: Notwithstanding Section 1.7 of Credit Derivatives Definitions, the day falling one year after the date upon which the Outstanding Portfolio Size is reduced to zero and the Outstanding Portfolio Size is zero for at least one year.
Floating Rate Payer: Party [A] ("Buyer")
Fixed Rate Payer: Party [B] ("Seller")
Attachment Point: [ ]%
Detachment Point: [ ]%
Weighting: [ ]%
Original Tranche Notional: USD [ ]
Initial Tranche Factor: [ ]%
Outstanding Tranche Notional Amount[1]: An amount, as of the date of determination, equal to:
[1] Additional language required for trades with Reference Obligations with uncured principal losses and interest shortfalls prior to the trade date.
  (i) the product of the Original Tranche Notional and the Initial Tranche Factor; plus,
  (ii) the sum of each incurred Principal Reimbursement Amount; minus,
  (iii) the sum of each Incurred Principal Loss Amount; minus,
  (iv) the greater of (a) an amount equal to (I) the sum of each Principal Payment Amount, minus (II) the Initial Portfolio, plus (III) the Loss Cap; and (b) zero;
  provided, if such amount is less than zero, the Outstanding Tranche Notional Amount shall be zero.
Tranche Width: A percentage equal to the Detachment Point minus the Attachment Point.
Initial Portfolio Size An amount equal to the Original Tranche Notional divided by the Tranche Width.
Outstanding Portfolio Size: An amount, as of the relevant date of determination, equal to the sum of the Reference Obligation Notional Amounts in respect of each Reference Obligation.
Loss Threshold: An amount equal to the product of the Initial Portfolio Size and the Attachment Point.
Loss Cap: An amount equal to the product of the Initial Portfolio Size and the Detachment Point.
Reference Obligation Notional Amount: With respect to each Reference Obligation, an amount, as of the relevant date of determination, equal to
  (i) the product of (a) the Initial Face Amount and (b) Initial Factor (in respect of such Reference Obligation); minus,
  (ii) the sum of each Principal Payment Amount in respect of such Reference Obligation; minus,
  (iii) sum of each Principal Loss Amount in respect of such Reference Obligation; plus,
  (iv) the sum of each Principal Reimbursement Amount in respect of such Reference Obligation;
  provided, if such amount is less than zero, the Reference Obligation Notional Amount in respect of such Reference Obligation shall be zero.
Calculation Agent: [Party A]
Calculation Agent City: New York
Business Days: New York and London
Business Day Convention: Following (which, with the exception of the Effective Date, the Final Amortization Date, each Reference Obligation Payment Date and the period end date of each Reference Obligation Calculation Period, shall apply to any date referred to in this confirmation that falls on a day that is not a Business Day).

Reference Entity: Each entity listed in Annex A attached hereto; thereafter, any entity that succeeds to the obligations of such Reference Entity under the related Reference Obligation.

Section 2.2 of the Credit Derivatives Definitions shall not apply.

Reference Obligation: The obligation set out opposite the applicable Reference Entity in Annex A. Section 2.30 of the Credit Derivatives Definitions shall not apply.

The Reference Obligations are used herein solely to make certain calculations hereunder and there is no requirement that Buyer or Seller own any of the Reference Obligations.

Initial Face Amount: With respect to each Reference Obligation, an amount equal to the product of (i) the Initial Portfolio Size, and (ii) the Weighting.

Initial Factor: With respect to a Reference Obligation, the factor set forth opposite the relevant Reference Obligation in Annex A.

Applicable Percentage On any day, with respect to each Reference Obligation, a percentage equal to A divided by B.
"A" means, with respect to a Reference Obligation, the product of the Initial Face Amount and the Initial Factor.
"B" means, with respect to a Reference Obligation, the product of the Original Principal Amount and the Initial Factor.
(i) as increased by the outstanding principal balance of any further issues by the Reference Entity that are fungible with and form part of the same legal series as such Reference Obligation; and
(ii) as decreased by any cancellations of some or all of the Outstanding Principal Amount resulting from purchases of such Reference Obligation by or on behalf of the Reference Entity.

Initial Payment: If an Initial Payment Payer and an Initial Payment Amount are specified below, the Initial Payment Payer shall pay an amount equal to the Initial Payment Amount to the other party on the date that is five Business Days following the Trade Date Initial Payment Payer: [ ] [Not Applicable]
Initial Payment Amount: USD [ ] [Not Applicable]

2. Fixed Payments

Fixed Rate: [ ]%
Fixed Rate Payer Period End Date: [The 25th calendar day of each month.]
Fixed Rate Payer Payment Dates: [The fifth Business Day following each Fixed Rate Payer Period End Date.]
Fixed Rate Day Count Fraction: ACT/360
Fixed Amount: If the Attachment Point is equal to zero, an amount, subject to a minimum of zero, equal to:
(i) the Aggregate Asset Premium; minus,
(ii) the sum of the Reference Tranche Fixed Amount for each Reference Tranche that has an Upper Strike that is greater than the Detachment Point.
If the Attachment Point is not equal to zero, an amount equal to the lesser of:
(i) the product of:
(a) the Fixed Rate;
(b) an amount equal to:
(1) the sum of the Outstanding Tranche Notional Amount as of 5:00 p.m. in the Calculation Agent City on each day in the related Fixed Rate Payer Calculation Period; divided by
(2) the actual number of days in the related Fixed Rate Payer Calculation Period; and
(c) the Fixed Rate Day Count Fraction; and (ii) an amount, subject to a minimum of zero, equal to:
(a) the Aggregate Asset Premium; minus
(b) the sum of the Reference Tranche Fixed Amount for each Reference Tranche that has an Upper Strike that is greater than the Detachment Point.

Aggregate Asset Premium: Means, with respect to a Fixed Rate Payer Calculation Period, and amount equal to the product of:
(i) the Portfolio Reference Spread;
(ii) an amount equal to:
(a) the sum of the Outstanding Portfolio Size as of 5:00 pm in the Calculation Agent City on each day in the related Fixed Rate Payer Calculation Period; divided by,
(b) the actual number of days in the related Fixed Rate Payer Calculation Period; and,
(iii) the relevant Fixed Rate Day Count Fraction.

3. Fixed Payments

Floating Rate Payer Payment Dates: In relation to one or more Floating Amount Events, the first Fixed Rate Payer Payment Date falling at least two Business Days after delivery of a notice by the Calculation Agent to the parties or a notice by Buyer to Seller (each such notice, a "Floating Amount Event Notice") containing a description of the facts relevant to the determination that one or more Floating Amount Events have occurred and showing in reasonable detail the related Floating Amount (if any) was calculated.

Notwithstanding anything herein to the contrary, Buyer and Calculation Agent may each deliver one Floating Amount Event Notice with respect to each Floating Rate Payer Payment Date; provided, the later Floating Amount Event Notice (if any) must include each Floating Amount Event in the earlier Floating Amount Event Notice; provided further, the Floating Amount on such Floating Rate Payer Payment Date shall be the amount specified in the last Floating Amount Event Notice delivered with respect to such Floating Rate Payer Payment Date.

Floating Payments Seller shall pay the relevant Floating Amount to Buyer on the relevant Floating Rate Payer Payment Date.

For avoidance of doubt, Seller shall have no obligation to pay a Floating Amount in respect of a Floating Amount Event that occurs outside the Term of this Transaction. For the avoidance of doubt, the Conditions to Settlement under the Credit Derivatives Definitions shall not apply.

Floating Amount Event: A Writedown, a Failure to Pay Principal or an Interest Shortfall.

Floating Amount: With respect to each Floating Rate Payer Payment Date, an amount equal to the sum of:
(i) the Incurred Principal Loss Amount(s) (if any) specified in a Floating Amount Event Notice delivered after the immediately preceding Floating Rate Payer Payment Date; and,
(ii) the Incurred Interest Shortfall Amount(s) (if any) specified in a Floating Amount Event Notice delivered after the immediately preceding Floating Rate Payer Payment Date.

4. Additional Fixed Payments:

Additional Fixed Amount Payment Dates: In relation to an Additional Fixed Amount Event with respect to a Reference Obligation, the first Fixed Rate Payer Payment Date falling at least two Business Days after delivery of a notice by the Calculation Agent to the parties or a notice by Seller to Buyer (each such notice, an "Additional Fixed Event Notice") containing a description of the facts relevant to the determination that an Additional Fixed Amount Event has occurred and showing in reasonable detail the related Additional Fixed Amount (if any) was calculated.

Notwithstanding anything herein to the contrary, Seller and Calculation Agent may each deliver one Additional Fixed Amount Event Notice with respect to each Additional Fixed Amount Payment Date; provided, the later Additional Fixed Amount Event Notice (if any) must include each Additional Fixed Amount Event in the earlier Additional Fixed Amount Event Notice; provided further, the Additional Fixed Amount on such Additional Fixed Amount Payment Date shall be the amount specified in the last Additional Fixed Amount Event Notice delivered with respect to such Additional Fixed Amount Payment Date.]

Additional Fixed Payments: Buyer shall pay the relevant Additional Fixed Amount to Seller on the relevant Additional Fixed Amount Payment Date.

For avoidance of doubt, Buyer shall have no obligation to pay an Additional Fixed Amount in respect of an Additional Fixed Amount Event that occurs outside the Term of this Transaction.

Additional Fixed Payment Event: A Writedown Reimbursement, a Principal Shortfall Reimbursement or an Interest Shortfall Reimbursement.

Additional Fixed Amount: With respect to each Additional Fixed Amount Payment Date, an amount equal to the sum of:
  (i) the Incurred Principal Reimbursement Amount(s) (if any) specified in an Additional Fixed Amount Event Notice delivered after the immediately preceding Additional Fixed Amount Payment Date; and
  (ii) the Incurred Interest Shortfall Reimbursement Amount(s) (if any) specified in an Additional Fixed Amount Event Notice delivered after the immediately preceding Additional Fixed Amount Payment Date.

5. Principal Loss:

Incurred Principal Loss Amount: With respect to a Floating Rate Payer Payment Date, an amount equal to the lesser of:
  (i) (a) the Periodic Principal Loss Amount, minus
      (b) the Periodical Principal Reimbursement Amount, subject to a minimum of zero;
  (ii) (a) the Aggregate Principal Loss Amount, minus
      (b) the Loss Threshold, subject to a minimum of zero; and,
  (iii) the Outstanding Tranche Notional Amount as of the immediately preceding Fixed Rate Payer Payment Date.

Principal Loss Amount: With respect to a Reference Obligation a Writedown Amount or a Principal Shortfall Amount in respect of such Reference Obligation determined on or prior to the fifth Business Day following the Effective Maturity Date of such Reference Obligation.

Periodic Principal Loss Amount: With respect to a Floating Rate Payer Payment Date, an amount equal to the sum of the Principal Loss Amount(s) in respect of each Writedown (if any) and each Failure to Pay Principal (if any) for each Reference Obligation hereof specified in a Floating Amount Event Notice delivered in respect of such Floating Rate Payer Payment Date.

Aggregate Principal Loss Amount: As of the relevant date of determination, an amount equal to:
  (i) the sum of the Principal Loss Amount(s) in respect of each Writedown (if any) and each Failure to Pay Principal (if any) for each Reference Obligation hereof occurring prior to such date (if any); minus,
  (ii) the sum of the Principal Reimbursement Amount(s) in respect of each Writedown Reimbursement (if any) and each Principal Shortfall Reimbursement (if any) for each Reference Obligation hereof occurring prior to such date;

provided, if such amount is less than zero, the Aggregate Principal Loss Amount shall be zero.

Incurred Principal Reimbursement Amount: With respect to an Additional Fixed Amount Payment Date, an amount equal to the lesser of:
  (i) an amount, subject to a minimum of zero, equal to:
      (a) the Periodic Principal Reimbursement Amount, minus,
      (b) the Periodical Principal Loss Amount, minus,
      (c) the greater of (1) the Aggregate Principal Loss Amount as of the immediately preceding Fixed Rate Payer Calculation Period, minus, the Loss Cap, and (2) zero; and,
  (ii) an amount subject to a minimum of zero, equal to:
      (a) the sum of the Incurred Principal Loss Amounts determined on or prior to such Additional Fixed Amount Payment Date (if any); minus,
      (b) the sum of the Incurred Principal Reimbursement Amounts (if any) determined on or prior to the immediately preceding Additional Fixed Amount Payment Date.

Principal Reimbursement Amount: With respect to a Reference Obligation, a Writedown Reimbursement Amount or a Principal Shortfall Reimbursement Amount in respect of such Reference Obligation determined on or prior to the fifth Business Day following the day that is one calendar year after the Effective Maturity Date of such Reference Obligation.

Periodic Principal Payment Reimbursement Amount: With respect to an Additional Fixed Amount Payment Date, an amount equal to the sum of the Principal Reimbursement Amount(s) in respect of each Writedown Reimbursement (if any) and each Principal Shortfall Reimbursement (if any) for each Reference Obligation hereof specified in an Additional Fixed Amount Event Notice delivered in respect of such Additional Fixed Amount Payment Date (if any).

6. Interest Shortfall

Actual Interest Amount: With respect to any Reference Obligation Payment Date in respect of a Reference Obligation, payment by or on behalf of the Issuer of an amount in respect of interest due under such Reference Obligation (including, without limitation, any deferred interest or defaulted interest but excluding payments in respect of prepayment penalties, yield maintenance provisions or principal, except that the Actual Interest Amount shall include any payment of principal representing capitalized interest) to the holder(s) of such Reference Obligation in respect of such Reference Obligation.

Expected Interest Amount: With respect to any Reference Obligation Payment Date in respect of a Reference Obligation, the amount of current interest that would accrue during the related Reference Obligation Calculation Period calculated using the Reference Obligation Coupon on a principal balance of such Reference Obligation equal to (a) the Outstanding Principal Amount taking into account any reductions due to a principal deficiency balance or realized loss amount (however described in the Underlying Instruments) that are attributable to such Reference Obligation minus (b) the Aggregate Implied Writedown Amount (if any) for such Reference Obligation and that will be payable on the related Reference Obligation Payment Date assuming for this purpose that sufficient funds are available therefor in accordance with the Underlying Instruments.

Except as provided in (a) in the previous sentence, the Expected Interest Amount in respect of a Reference Obligation shall be determined without regard to (i) unpaid amounts in respect of accrued interest on prior Reference Obligation Payment Dates or (ii) any prepayment penalties or yield maintenance provisions.

The Expected Interest Amount shall be determined without regard to the effect of any provisions (however described) of the Underlying Instruments that otherwise permit the limitation of due payments to distributions of funds from proceeds of the Underlying Assets, or that provide for the capitalization or deferral of interest on such Reference Obligation, or that provide for the extinguishing or reduction of such payments or distributions (but, for the avoidance of doubt, taking account of any Writedown within paragraph (i) of the definition of "Writedown" occurring in accordance with the relevant Underlying Instruments).

Interest Shortfall: With respect to any Reference Obligation Payment Date in respect of a Reference Obligation, either (i) the nonpayment of an Expected Interest Amount or (ii) the payment of an Actual Interest Amount that is less than the Expected Interest Amount.

For the avoidance of doubt, the occurrence of an event within (i) or (ii) shall be determined taking into account any payment made under the relevant Reference Policy, if applicable.

Unadjusted Interest Shortfall Amount: With respect to any Reference Obligation Payment Date in respect of a Reference Obligation, an amount equal to the greater of:
(a) zero; and
(b) the amount equal to the product of:
  (i) (A) the Expected Interest Amount; minus
    (B) the Actual Interest Amount; and
  (ii) the Applicable Percentage;
provided that, with respect to the first Reference Obligation Payment Date in respect of such Reference Obligation, the Interest Shortfall Amount shall be the amount determined in accordance with (a) and (b) above multiplied by a fraction equal to:
  (i) the number of days in the initial Fixed Rate Payer Calculation Period; over
  (ii) the number of days in the first Reference Obligation Calculation Period with respect to such Reference Obligation.

Interest Shortfall Amount: With respect to any Reference Obligation Payment Date for a Reference Obligation on or prior to the fifth Business Day following the Effective Maturity Date of such Reference Obligation, in respect of a Reference Obligation, an amount equal to the lesser of the related Unadjusted Interest Shortfall Amount and the related Reference Obligation Interest Shortfall Cap Amount.

Interest Shortfall Reimbursement: With respect to any Reference Obligation Payment Date for a Reference Obligation on or prior to the fifth Business Day following the day that is one calendar year after the Effective Maturity Date of such Reference Obligation, the payment by or on behalf of the Issuer of an Actual Interest Amount in respect of such Reference Obligation that is greater than the Expected Interest Amount.

Unadjusted Interest Shortfall Reimbursement Amount: With respect to any Reference Obligation Payment Date in respect of a Reference Obligation, the product of (a) the amount of any Interest Shortfall Reimbursement on such day and (b) the Applicable Percentage.

Interest Shortfall Reimbursement Amount: As set forth in the Annex D attached hereto.

Incurred Interest Shortfalls:

Incurred Interest Shortfall Amount: With respect to each Fixed Rate Payer Calculation Period, an amount equal to the lesser of:
(i) an amount, subject to a minimum of zero, equal to
  (a) the relevant Periodic Interest Shortfall Amount; minus,
  (b) the relevant Periodic Interest Shortfall Reimbursement Amount; minus,
  (c) relevant Interest Shortfall Threshold; and,
(ii) the relevant Interest Shortfall Cap.

Periodic Interest Shortfall Amount: With respect to each Fixed Rate Payer Calculation Period, an amount equal to the sum of the Interest Shortfall Amount(s) in respect of each Interest Shortfall (if any) and Reference Obligation hereof occurring within such Fixed Rate Payer Calculation Period.

Cumulative Incurred Interest Shortfall Amount: With respect to each Fixed Rate Payer Calculation Period, an amount equal to:
(i) the relevant Incurred Interest Shortfall Amount; minus,
(ii) the relevant Incurred Interest Shortfall Reimbursement Amount; plus,
(iii) the product of:
  (a) the Cumulative Incurred Interest Shortfall Amount as of the immediately preceding Fixed Rate Payer Period End Date; and,
  (b) the relevant Interest Shortfall Compounding Factor.

Interest Shortfall Compounding Factor: With respect to each Fixed Rate Payer Calculation Period, an percentage equal to the sum of
(i) 100.00%; and,
(ii) the product of (a) the sum of the Fixed Rate and the Relevant Rate, and (b) the Fixed Rate Day Count Fraction in respect of such Fixed Rate Payer Calculation Period.

Relevant Rate: With respect to a Fixed Rate Payer Calculation Period, the Floating Rate, expressed as a decimal number with seven decimal places, that would be determined if:
(a) the 2000 ISDA Definitions (and not the 2003 ISDA Credit Derivatives Definitions) applied to this paragraph;
(b) the Fixed Rate Payer Calculation Period were a "Calculation Period" for purposes of such determination; and
(c) the following terms applied:
  (i) the Floating Rate Option were USD-LIBOR-BBA;
  (ii) the Designated Maturity were the period that corresponds to the usual length of a Fixed Rate Payer Calculation Period; and
  (iii) the Reset Date were the first day of the Calculation Period;

Interest Shortfall Threshold: As set forth in the Annex C attached hereto.

Interest Shortfall Cap: With respect to each Fixed Rate Payer Calculation Period, an amount equal to the Fixed Amount for such Fixed Rate Payer Calculation Period.

Incurred Interest Shortfall Reimbursements:

Incurred Interest Shortfall Reimbursement Amount: With respect to each Fixed Rate Payer Calculation Period, an amount equal to the lesser of:
(i) an amount, subject to a minimum of zero, equal to:
  (a) the relevant Periodic Interest Shortfall Reimbursement Amount; minus, (b) the relevant Periodic Interest Shortfall Amount; minus, (c) the relevant Cumulative Excess Interest Shortfall Amount; and, (ii) the product of:

(a) the Cumulative Incurred Interest Shortfall Amount as of the immediately preceding Fixed Rate Payer Period End Date; and, (b) the relevant Interest Shortfall Compounding Factor.

Periodic Interest Shortfall Reimbursement Amount: With respect to each Fixed Rate Payer Calculation Period, an amount equal to the sum of the Interest Shortfall Reimbursement Amount(s) in respect of each Interest Shortfall Reimbursement (if any) and Reference Obligation hereof occurring within such Fixed Rate Payer Calculation Period.

Cumulative Excess Interest Shortfall Amount: As set forth in the Annex C.

1. Additional Provisions:

(a) Delivery of Servicer Report

If either party makes a request in writing, the Calculation Agent agrees to provide such party with a copy of the most recent Servicer Report promptly following receipt of such request, if and to the extent such Servicer Report is reasonably available to the Calculation Agent (whether or not the Calculation Agent is a holder of the Reference Obligation). In addition, if a Floating Payment or an Additional Fixed Payment is due hereunder, then the Calculation Agent or the party that notifies the other party that the relevant Floating Payment or Additional Fixed Payment is due, as applicable, (the "Notifying Party") shall deliver a copy of any Servicer Report relevant to such payment that is requested by the party that is not the Notifying Party or by either party where the Notifying Party is the Calculation Agent, if and to the extent that such Servicer Report is reasonably available to the Notifying Party (whether or not the Notifying Party is a holder of the Reference Obligation).]

(b) Calculation Agent and Buyer and Seller Determinations

The Calculation Agent shall be responsible for determining and calculating, for each Reference Obligation, (i) the Fixed Amount payable on each Fixed Rate Payer Payment Date; (ii) the occurrence of a Floating Amount Event, (iii) the occurrence of an Additional Fixed Payment Event, (iv) the Floating Amount(s) (if any) and all amounts relating thereto and (v) the Additional Fixed Amount(s) (if any) and all amounts relating thereto[; provided that notwithstanding the above, each of Buyer and Seller shall be entitled to determine and calculate the above amounts to the extent that Buyer or Seller, as applicable, has the right to deliver a notice to the other party demanding payment of such amount.]

The Calculation Agent or Buyer or Seller, as applicable, shall make such determinations and calculations solely on the basis of the Servicer Reports to the extent such Servicer Reports are reasonably available to the Calculation Agent or such party. The Calculation Agent or Buyer or Seller, as applicable, shall, as soon as practicable after making any of the determinations or calculations specified in (ii) through (v) above, notify the parties or the other party, as applicable, of such determinations and calculations.

(c) Adjustment of Calculation Agent Determinations

To the extent that a Servicer furnishes any Servicer Reports correcting information contained in previously issued Servicer Reports, and such corrections impact calculations or determinations made hereunder, such calculations or determinations shall be adjusted retroactively by the Calculation Agent to reflect the corrected information (provided that, for the avoidance of doubt, no amounts in respect of interest shall be payable by either party and provided that the Calculation Agent in performing the calculations or determinations pursuant to this paragraph will assume that no interest has accrued on any adjusted amount), and the Calculation Agent shall promptly notify both parties of any corrected payments required by either party. Any required corrected payments shall be made on the second Fixed Rate Payer Payment Date following the day on which such notification by the Calculation Agent is effective.

[(d) Disclaimers

Without limitation of Section 9.1(b)(iv) of the Credit Derivatives Definitions (as modified above), each party acknowledges that the other party or its Affiliates or the Calculation Agent may act from time to time as an originator, sponsor, servicer, administrator, trustee, underwriter or market maker, or otherwise act in a capacity as a result of which such party or its Affiliates may be in possession of information in relation to one or more Reference Obligations or Reference Entities contained in Annex A and that may or may not be publicly available or known to the other party. No furnishing by a party or its Affiliates or the Calculation Agent of any notice, report, or other information with respect to any Reference Obligation or any Reference Entity ("Reference Obligation Information") shall prejudice the foregoing provision or Section 9.1(b)(iv) of the Credit Derivatives Definitions, constitute a representation or warranty as to the correctness or completeness of such Reference Obligation Information, give rise to any duty to supplement, update or revise the Reference Obligation Information so provided, or otherwise result in such party or the Calculation Agent having any responsibility for the content of such Reference Obligation Information.]

2. Additional Definitions and Amendments to the Credit Derivatives Definitions (a) References in Section 9.1(a) of the Credit Derivatives Definitions as well as Section 3(a)(iv) of the form of Novation Agreement set forth in Exhibit E to the Credit Derivatives Definitions to the Reference Entity shall be deemed to be references to each Reference Entity and the Insurer in respect of the relevant Reference Policy, if applicable.

(b) the following terms have the meanings given below:

"Actual Principal Amount" means, with respect to a Reference Obligation and the Final Amortization Date or the Legal Final Maturity Date, an amount paid on such day by or on behalf of the relevant Issuer in respect of principal (excluding any capitalized interest) to the holder(s) of such Reference Obligation in respect of such Reference Obligation.

"Aggregate Implied Writedown Amount" means, with respect to a Reference Obligation, the greater of (i) zero and (ii) the aggregate of all Implied Writedown Amounts minus the aggregate of all Implied Writedown Reimbursement Amounts.

"Current Period Implied Writedown Amount" means, with respect to a Reference Obligation in respect of a Reference Obligation Calculation Period, an amount determined as of the last day of such Reference Obligation Calculation Period equal to the greater of:

(i) zero; and (ii) the product of:

(A) the Implied Writedown Percentage; and (B) the greater of:

(1) zero; and (2) the lesser of (x) the Pari Passu Amount and (y) the Pari Passu Amount plus the Senior Amount minus the aggregate outstanding asset pool balance backing the payment obligations on such Reference Obligation (all such outstanding asset pool balances as obtained by the Calculation Agent from the most recent Servicer Report for such Reference Obligation available as of such day), calculated based on the face amount of the assets then in such pool, whether or not any such asset is performing.

"Effective Maturity Date" means, with respect to a Reference Obligation, the earlier of (a) the Legal Final Maturity Date and (b) the Final Amortization Date.

"Expected Principal Amount" means, with respect to a Reference Obligation and the Final Amortization Date or the Legal Final Maturity Date, an amount equal to (i) the Outstanding Principal Amount of such Reference Obligation payable on such day (excluding capitalized interest) assuming for this purpose that sufficient funds are available for such payment, where such amount shall be determined in accordance with the Underlying Instruments, minus (ii) the sum of (A) the Aggregate Implied Writedown Amount (if any) and (B) the net aggregate principal deficiency balance or realized loss amounts (however described in the Underlying Instruments) that are attributable to such Reference Obligation. The Expected Principal Amount shall be determined without regard to the effect of any provisions (however described) of the Underlying Instruments that permit the limitation of due payments or distributions of funds in accordance with the terms of such Reference Obligation or that provide for the extinguishing or reduction of such payments or distributions.

"Failure to Pay Principal" means, with respect to a Reference Obligation, (i) a failure by the relevant Reference Entity (or any Insurer thereof) to pay an Expected Principal Amount on the Final Amortization Date or the Legal Final Maturity Date, as the case may be or (ii) payment on any such day of an Actual Principal Amount that is less than the Expected Principal Amount; provided that the failure by such Reference Entity (or any Insurer thereof) to pay any such amount in respect of principal in accordance with the foregoing shall not constitute a Failure to Pay Principal if such failure has been remedied within any grace period applicable to such payment obligation under the Underlying Instruments or, if no such grace period is applicable, within three Business Days after the day on which the Expected Principal Amount was scheduled to be paid.

"Final Amortization Date" means, with respect to a Reference Obligation, the first to occur of (i) the date on which the Reference Obligation Notional Amount is reduced to zero and (ii) the date on which the assets backing the Reference Obligation or designated to fund amounts due in respect of the Reference Obligation are liquidated, distributed or otherwise disposed of in full and the proceeds thereof are distributed or otherwise disposed of in full.

"Implied Writedown Amount" means, with respect to a Reference Obligation, (i) if the Underlying Instruments do not provide for writedowns, applied losses, principal deficiencies or realized losses as described in (i) of the definition of "Writedown" to occur in respect of the Reference Obligation, on any Reference Obligation Payment Date, an amount determined by the Calculation Agent equal to the excess, if any, of the Current Period Implied Writedown Amount over the Previous Period Implied Writedown Amount, in each case in respect of the Reference Obligation Calculation Period to which such Reference Obligation Payment Date relates, and (ii) in any other case, zero.

"Implied Writedown Percentage" means, with respect to a Reference Obligation, (i) the Outstanding Principal Amount divided by (ii) the Pari Passu Amount.

"Implied Writedown Reimbursement Amount" means, with respect to a Reference Obligation, (i) if the Underlying Instruments do not provide for writedowns, applied losses, principal deficiencies or realized losses as described in (i) of the definition of "Writedown" to occur in respect of the Reference Obligation, on any Reference Obligation Payment Date, an amount determined by the Calculation Agent equal to the excess, if any, of the Previous Period Implied Writedown Amount for the Reference Obligation over the Current Period Implied Writedown Amount for the Reference Obligation, in each case in respect of the Reference Obligation Calculation Period to which such Reference Obligation Payment Date relates, and (ii) in any other case, zero; provided that the aggregate of all Implied Writedown Reimbursement Amounts for a Reference Obligation at any time shall not exceed the product of the Pari Passu Amount for the Reference Obligation and the Implied Writedown Percentage for the Reference Obligation, "Insurer" means, with respect to a Reference Obligation, the insurer of such Reference Obligation specified in Annex A.

"Issuer" means, with respect to a Reference Obligation, the issuer of such Reference Obligation specified in Annex A.

"Legal Final Maturity Date" means, with respect to a Reference Obligation, the date set out in the Annex A for such Reference Obligation (subject, for the avoidance of doubt, to any business day convention applicable to the legal final maturity date of such Reference Obligation), provided that if the legal final maturity date of such Reference Obligation is amended, the Legal Final Maturity Date shall be such date as amended.

"Original Principal Amount" means, with respect to a Reference Obligation, the amount specified as such in Annex A.

"Outstanding Principal Amount" means, with respect to a Reference Obligation as of any date of determination, the outstanding principal balance of such Reference Obligation as of such date, which shall take into account:
  (i) all payments of principal;
  (ii) all writedowns or applied losses (however described in the Underlying Instruments) resulting in a reduction in the outstanding principal balance of such Reference Obligation (other than as a result of a scheduled or unscheduled payment of principal);
  (iii) forgiveness of any amount by the holders of such Reference Obligation pursuant to an amendment to the Underlying Instruments resulting in a reduction in the outstanding principal balance of such Reference Obligation;
  (iv) any payments reducing the amount of any reductions described in (ii) and (iii) of this definition; and
  (v) any increase in the outstanding principal balance of such Reference Obligation that reflects a reversal of any prior reductions described in (ii) and (iii) of this definition).

"Pari Passu Amount" means, with respect to a Reference Obligation as of any date of determination, the aggregate of the Outstanding Principal Amount of the Reference Obligation and the aggregate outstanding principal balance of all obligations of the relevant Reference Entity backed by the relevant Underlying Assets and ranking pari passu in priority with such Reference Obligation.

"Previous Period Implied Writedown Amount" means, with respect to a Reference Obligation in respect of a Reference Obligation Calculation Period, the Current Period Implied Writedown Amount as determined in relation to the last day of the immediately preceding Reference Obligation Calculation Period for such Reference Obligation.

"Principal Payment" means, with respect to a Reference Obligation and any Reference Obligation Payment Date, the occurrence of a payment of an amount to the holders of such Reference Obligation in respect of principal (scheduled or unscheduled) in respect of such Reference Obligation including any amount determined under sub-clause (i) of Writedown Reimbursement, but excluding payments in respect of principal representing capitalized interest, and any amount determined under sub-clause (ii) or (iii) of Writedown Reimbursement or Interest Shortfall Reimbursement.

"Principal Payment Amount" means, with respect to any Reference Obligation Payment Date for a Reference Obligation, an amount equal to the product of (i) the amount of any Principal Payment on such date and (ii) the Applicable Percentage.

"Principal Shortfall Amount" means, with respect to a Reference Obligation, in respect of a Failure to Pay Principal, an amount equal to the greater of:
(i) zero; and
(ii) the amount equal to the product of:
  (A) the Expected Principal Amount minus the relevant Actual Principal Amount; and
  (B) the Applicable Percentage;

If the Principal Shortfall Amount in respect of a Reference Obligation would be greater than the Reference Obligation Notional Amount immediately prior to the occurrence of such Failure to Pay Principal, then such Principal Shortfall Amount shall be deemed to be equal to the Reference Obligation Notional Amount at such time.

"Principal Shortfall Reimbursement" means, with respect to a Reference Obligation on any day on or prior to the fifth Business Day following the day that is one calendar year after the Effective Maturity Date of such Reference Obligation, the payment by or on behalf of the relevant Issuer of an amount in respect of such Reference Obligation in or toward the satisfaction of any deferral of or failure to pay principal arising from one or more prior occurrences of a Failure to Pay Principal.

"Principal Shortfall Reimbursement Amount" means, with respect to a Reference Obligation on any day, the product of (i) the amount of any relevant Principal Shortfall Reimbursement on such day and (ii) the relevant Applicable Percentage.

"Principal Shortfall Reimbursement Payment Amount" means, with respect to a Reference Obligation and an Additional Fixed Amount Payment Date, the sum of the Principal Shortfall Reimbursement Amounts in respect of all Principal Shortfall Reimbursements (if any) made during the Reference Obligation Calculation Period relating to such Additional Fixed Amount Payment Date (or, in the case of an Additional Fixed Amount Payment Date after the final Fixed Rate Payer Payment Date, made on the related Reference Obligation Payment Date), provided that the aggregate of all such Principal Shortfall Reimbursement Payment Amounts at any time shall not exceed the aggregate of all Floating Amounts (determined without regard to the Effective Date) in respect of occurrences of Failure to Pay Principal prior to such Additional Fixed Amount Payment Date.

"Reference Obligation Calculation Period" means, with respect to a Reference Obligation and each Reference Obligation Payment Date, a period corresponding to the interest accrual period relating to such Reference Obligation Payment Date pursuant to the relevant Underlying Instruments.

"Reference Obligation Coupon" means, with respect to a Reference Obligation, the periodic interest rate applied in relation to each related Reference Obligation Calculation Period on the related Reference Obligation Payment Date, as determined in accordance with the terms of the relevant Underlying Instruments as at the Effective Date, without regard to any subsequent amendment.

"Reference Obligation Payment Date" means, with respect to a Reference Obligation, (i) each scheduled distribution date for such Reference Obligation occurring on or after the Effective Date and on or prior to the relevant Legal Final Maturity Date, determined in accordance with the Underlying Instruments and (ii) any day after the Effective Maturity Date on or prior to the fifth Business Day following the day that is one calendar year after the Effective Maturity Date of such Reference Obligation on which a payment is made in respect of such Reference Obligation.

"Reference Policy" means, with respect to a Reference Obligation, the reference policy for such Reference Obligation specified in Annex A.

"Senior Amount" means, with respect to a Reference Obligation as of any day, the aggregate outstanding principal balance of all obligations of the Reference Entity backed by the Underlying Assets and ranking senior in priority to such Reference Obligation.

"Servicer" means, with respect to a Reference Obligation, any trustee, servicer, sub-servicer, master servicer, fiscal agent, paying agent or other similar entity responsible for calculating payment amounts or providing reports pursuant to the Underlying Instruments.

"Servicer Reports" means, with respect to a Reference Obligation, periodic statements or reports regarding the Reference Obligation provided by the Servicer to holders of the Reference Obligation.

"Underlying Assets" means, with respect to a Reference Obligation, the assets backing the Reference Obligation for the benefit of the holders of such Reference Obligation and which are expected to generate the cashflows required for the servicing and repayment (in whole or in part) of such Reference Obligation, or the assets to which a holder of such Reference Obligation is economically exposed where such exposure is created synthetically.

"Underlying Instruments" means, with respect to a Reference Obligation, the indenture, trust agreement, pooling and servicing agreement or other relevant agreement(s) setting forth the terms of the Reference Obligation.

"Writedown" means, with respect to a Reference Obligation, the occurrence at any time on or after the Effective Date of:
(i) (A) a writedown or applied loss (however described in the Underlying Instruments) resulting in a reduction in the Outstanding Principal Amount of such Reference Obligation (other than as a result of a scheduled or unscheduled payment of principal); or
(B) the attribution of a principal deficiency or realized loss (however described in the Underlying Instruments) to such Reference Obligation resulting in a reduction or subordination of the current interest payable on such Reference Obligation;
(ii) the forgiveness of any amount of principal by the holders of such Reference Obligation pursuant to an amendment to the Underlying Instruments resulting in a reduction in the Outstanding Principal Amount; or
(iii) if the Underlying Instruments do not provide for writedowns, applied losses, principal deficiencies or realized losses as described in (i) above to occur in respect of such Reference Obligation, an Implied Writedown Amount being determined in respect of such Reference Obligation by the Calculation Agent.

"Writedown Amount" means, with respect to a Reference Obligation on any day, the product of (i) the amount of any Writedown with respect to such Reference Obligation on such day and (ii) the Applicable Percentage.

"Writedown Reimbursement" means, with respect to a Reference Obligation on any day on or prior to the fifth Business Day following the day that is one calendar year after the Effective Maturity Date of such Reference Obligation, the occurrence of:
(i) a payment by or on behalf of the Issuer of an amount in respect of such Reference Obligation in reduction of any prior Writedowns;
(ii) (A) an increase by or on behalf of the Issuer of the Outstanding Principal Amount of such Reference Obligation to reflect the reversal of any prior Writedowns; or
(B) a decrease in the principal deficiency balance or realized loss amounts (however described in the Underlying Instruments) attributable to such Reference Obligation; or
(iii) if the Underlying Instruments do not provide for writedowns, applied losses, principal deficiencies or realized losses as described in (ii) above to occur in respect of such Reference Obligation, an Implied Writedown Reimbursement Amount being determined in respect of such Reference Obligation by the Calculation Agent.

"Writedown Reimbursement Amount" means, with respect to a Reference Obligation on any day, an amount equal to the product of
(i) the sum of all Writedown Reimbursements with respect to such Reference Obligation on that day; and
(ii) the Applicable Percentage;

"Writedown Reimbursement Payment Amount" means, with respect to a Reference Obligation and an Additional Fixed Amount Payment Date, the sum of the Writedown Reimbursement Amounts in respect of all Writedown Reimbursements (if any) during the Reference Obligation Calculation Period relating to such Additional Fixed Amount Payment Date (or, in the case of an Additional Fixed Amount Payment Date after the final Fixed Rate Payer Payment Date, on the related Reference Obligation Payment Date or date of determination of an Implied Writedown Reimbursement Amount, as the case may be), provided that the aggregate of all such Writedown Reimbursement Payment Amounts at any time shall not exceed the aggregate of all Floating Amounts with respect to such Reference Obligation (determined without regard to the Effective Date) in respect of Writedowns occurring prior to such Additional Fixed Amount Payment Date.

Annex C

Interest Shortfall Annex

Aggregate Loss Percentage: A percentage, as of the relevant date of determination equal to the quotient of (i) Aggregate Principal Loss Amount, and (ii) the Initial Portfolio Size.

Outstanding Portfolio Percentage: A percentage, as of the relevant date of determination equal to the sum of (i) the Outstanding Portfolio Size divided by the Initial Portfolio Size, and (ii) the Aggregate Loss Percentage.

Reference Tranche Matrix: The matrix attached hereto as Annex B

Reference Tranche: Each tranche specified in the Reference Tranche Matrix.

Lower Strike: With respect to a Reference Tranche, the percentage listed as such opposite the relevant Reference Tranche in the Reference Tranche Matrix.

Upper Strike: With respect to a Reference Tranche, the percentage listed as such opposite the relevant Reference Tranche in the Reference Tranche Matrix.

Reference Spread: With respect to a Reference Tranche, the rate listed as such opposite the relevant Reference Tranche in the Reference Tranche Matrix.

Outstanding Tranche Width: With respect to a Reference Tranche, a percentage as of the relevant date of determination equal to:
(i) the lesser of (a) the Outstanding Portfolio Percentage and (b) the relevant Upper Strike; minus,
(i) the greater of (a) the Aggregate Loss Percentage and (b) the relevant Lower Strike.

Subordinate Reference Tranche: With respect to a Reference Tranche, every other Reference Tranche with a lesser Lower Strike than such Reference Tranche.

Senior Reference Tranche: With respect to a Reference Tranche, every other Reference Tranche with a greater Lower Strike than such Reference Tranche.

Reference Tranche Fixed Amount: With respect to a Reference Tranche and a Fixed Rate Payer Calculation Period with respect to the Transaction:
For each Reference Tranche with a Lower Strike equal to zero, an amount, subject to a minimum of zero, equal to:

Annex A: Reference Portfolio

| Reference Entity | [Issuer:] | [Insurer:] | [Reference Policy:] | Bloomberg ID: | ISIN/ CUSIP | Legal final maturity date | Original Principal Amount (USD) | Initial Factor | Coupon |
| --- | --- | --- | --- | --- | --- | --- | --- | --- | --- |

Annex B: Reference Tranche Matrix

| [Reference] | [Reference Spread] | [Lower Strike] | [Upper Strike] |
| --- | --- | --- | --- |
| 1 | $S_1 = [\ ]\%$ | 0.00% | $X_1$ |
| 2 | $S_2 = [\ ]\%$ | $X_1 = [\ ]\%$ | $X_2$ |
| 3 | $S_3 = [\ ]\%$ | $X_2 = [\ ]\%$ | $X_3$ |
| 4 | $S_4 = [\ ]\%$ | $X_3 = [\ ]\%$ | $X_4$ |
| 5 | $S_5 = [\ ]\%$ | $X_4 = [\ ]\%$ | 100.00% |

Portfolio Reference Spread: [ ]%

(i) the Aggregate Asset Premium; minus
(ii) the sum of the Reference Tranche Fixed Amount of each Senior Reference Tranche For each Reference Tranche with a Lower Strike not equal to zero, an amount equal to the lesser of:
(i) the product of:
(a) the relevant Reference Spread;
(b) a percentage equal to:
(1) the sum of the relevant Outstanding Tranche Width as of 5:00 p.m in the Calculation Agent City on each day in the related Fixed Rate Payer Calculation Period; divided by, (2) the actual number of days in the related Fixed Rate Payer Calculation Period; and,
(c) the Initial Portfolio Size;
(d) the Fixed Rate Day Count Fraction; and
(ii) an amount, subject to a minimum of zero, equal to:
(a) the Aggregate Asset Premium; minus
(b) the sum of the Reference Tranche Fixed Amount of each Senior Reference Tranche.

Interest Shortfall Threshold: With respect to a Fixed Rate Payer Calculation Period, an amount equal to the sum the Reference Tranche Fixed Amount(s) for each Reference Transaction with an Upper Strike that is less than or equal to the Attachment Point.

Reference Tranche Incurred Interest Shortfall Amount: With respect to a Reference Tranche and a Fixed Rate Payer Calculation Period, an amount equal to the lesser of:
(i) the relevant Reference Tranche Fixed Amount; and,
(ii) an amount, subject to a minimum of zero, equal to:
(a) the relevant Periodic Interest Shortfall Amount; minus,
(b) the relevant Periodic Interest Shortfall Reimbursement Amount; minus,
(c) the sum of the Reference Tranche Fixed Amount(s) in respect of each Subordinate Reference Tranche (if any).

Reference Tranche Incurred Interest Shortfall Reimbursement Amount: With respect to a Reference Tranche and a Fixed Rate Payer Calculation Period, an amount equal to the lesser:
(i) the product of:
(a) relevant Reference Tranche Cumulative Incurred Interest Shortfall Amount as of the immediately preceding Fixed Rate Payer Period End Date; and,
(b) the relevant Reference Tranche Interest Shortfall Compounding Factor; and,
(ii) an amount, subject to a minimum of zero, equal to:
a) the relevant Periodic Interest Shortfall Reimbursement Amount; minus,
(b) the relevant Periodic Interest Shortfall Amount; minus,
(c) the sum of the product(s) of:
(1) Reference Tranche Cumulative Incurred Interest Shortfall Amount as of the immediately preceding Fixed Rate Payer Period End Date in respect of each Senior Reference Tranche (if any); and,
(2) Reference Tranche Interest Shortfall Compounding Factor in respect of the relevant Senior Reference Tranche (if any).

Reference Tranche Interest Shortfall Compounding Factor: With respect to a Reference Tranche and a Fixed Rate Payer Calculation Period, an percentage equal to the sum of:
(i) 100.00%; and,
(ii) the product of (a) the sum of the relevant Reference Spread and the Relevant Rate, and (b) the Fixed Rate Day Count Fraction in respect of such Fixed Rate Payer Calculation Period.

Reference Tranche Cumulative Incurred Interest Shortfall Amount: With respect to a Reference Tranche and a Fixed Rate Payer Calculation Period, an amount equal to:
(i) the relevant Reference Tranche Incurred Interest Shortfall Amount; minus,
(ii) the relevant Reference Tranche Incurred Interest Shortfall Reimbursement Amount; plus,
(iii) the product of:
(a) the Reference Tranche Cumulative Incurred Interest Shortfall Amount as of the immediately preceding Fixed Rate Payer Period End Date; and,
(b) the relevant Reference Tranche Interest Shortfall Compounding Factor.

Cumulative Excess Interest Shortfall Amount With respect to a Fixed Rate Payer Calculation Period, an amount equal to the sum of the Reference Tranche Cumulative Incurred Interest Shortfall Amount(s) for each Reference Transaction with an Lower Strike that is greater than or equal to the Detachment Point.

Annex D

Reference Obligation Interest Shortfall Cap Annex

Reference Obligation Interest Shortfall Cap Amount: With respect to each Reference Obligation, as of the date of determination, an amount equal to the product of:
(i) the Portfolio Reference Spread specified in the Reference Tranche Matrix;
(ii) the relevant Reference Obligation Notional Amount outstanding on the last day of the related Reference Obligation Calculation Period immediately prior to the related Reference Obligation Payment Date on which the relevant Interest Shortfall occurred, as adjusted for any increases or decreases of such Reference Obligation Notional Amount; and,
(ii) the actual number of days in the related Reference Obligation Calculation Period immediately prior to the Reference Obligation Payment Date on which the relevant Interest Shortfall occurred divided by 360.

Interest Shortfall Reimbursement Amount: With respect to each Reference Obligation, zero for the first Additional Fixed Amount Payment Date; with respect to any subsequent Additional Fixed Amount Payment Date and calculated as of the Reference Obligation Payment Date immediately preceding such Additional Fixed Amount Payment Date an amount equal to the greater of:
zero; and
(ii) the amount equal to:
(a) the product of:
(1) the related Cumulative Interest Shortfall Amount as of the Additional Fixed Amount Payment Date immediately preceding such Reference Obligation Payment Date; and
(2) the relevant Reference Obligation Interest Shortfall Compounding Factor for the Fixed Rate Payer Calculation Period immediately preceding such Additional Fixed Amount Payment Date (or 1.0 in respect of any Additional Fixed Amount Payment Date occurring after the final Fixed Rate Payer Calculation Date);
minus
(b) the Unadjusted Cumulative Interest Shortfall Amount as of such Reference Obligation Payment Date;
provided that if the Interest Shortfall Reimbursement Amount on an Additional Fixed Amount Payment Date would exceed the Unadjusted Interest Shortfall Reimbursement Amount in respect of the related Reference Obligation Payment Date, then such Interest Shortfall Reimbursement Amount shall be deemed to be equal to such Unadjusted Interest Shortfall Reimbursement Amount.

Unadjusted Cumulative Interest Shortfall Amount: With respect to each Reference Obligation and each Reference Obligation Payment Date thereof, an amount equal to the greater of:

zero; and (ii) an amount equal to:
  (a) the Unadjusted Cumulative Interest Shortfall Amount as of the Reference Obligation Payment Date immediately preceding such Reference Obligation Payment Date or, in the case of the first Reference Obligation Payment Date, zero; plus
  (b) the Interest Shortfall Amount (if any) in respect of such Reference Obligation Payment Date; plus
  (c) an amount determined by the Calculation Agent as the amount of interest that would accrue on the Unadjusted Cumulative Interest Shortfall Amount immediately preceding such Reference Obligation Payment Date during the related Reference Obligation Calculation Period pursuant to the Underlying Instruments or, in the case of the first Reference Obligation Payment Date, zero; minus
  (d) the Unadjusted Interest Shortfall Reimbursement Amount (if any) in respect of such Reference Obligation Payment Date.

Cumulative Interest Shortfall Amount: With respect to each Reference Obligation, the Cumulative Interest Shortfall Amount with respect to any Fixed Rate Payer Payment Date and any Additional Fixed Amount Payment Date falling on such Fixed Rate Payer Payment Date shall be an amount equal to the greater of:

zero; and (ii) the amount equal to:
  (a) the sum of:
    (1) the Unadjusted Interest Shortfall Amount for the Reference Obligation Payment Date corresponding to such Fixed Rate Payer Calculation Date; and
    (2) the product of:
      (A) the Cumulative Interest Shortfall Amount as of the Fixed Rate Payer Calculation Date immediately preceding such Fixed Rate Payer Payment Date (or zero in the case of the first Fixed Rate Payer Calculation Date); and
      (B) the relevant Reference Obligation Interest Shortfall Compounding Factor;
  minus
  (b) any Interest Shortfall Reimbursement Amount paid on such Fixed Rate Payer Calculation Date.

With respect to any Additional Fixed Amount Payment Date falling after the Legal Final Maturity Date of the related Reference Obligation, the Cumulative Interest Shortfall Amount shall be equal to:

(i) the Cumulative Interest Shortfall Amount as of the Additional Fixed Amount Payment Date immediately preceding such Additional Fixed Amount Payment Date (or as of the related Legal Final Maturity Date in the case of the first Additional Fixed Amount Payment Date occurring after the Legal Final Maturity Date of such Reference Obligation); minus (ii) any Interest Shortfall Reimbursement Amount paid on such Additional Fixed Amount Payment Date.

Reference Obligation Interest Shortfall Compounding Factor: With respect to each Fixed Rate Payer Calculation Period, an percentage equal to the sum of:

(i) 100.00%; and, (ii) the product of (a) the sum of the Portfolio Reference Spread and the Relevant Rate, and (b) the quotient of (1) the number of days in the related Reference Obligation Calculation Period with respect to such Reference Obligation and (2) 360.

What is claimed is:

1. A non-transitory computer readable storage medium having computer-executable instructions recorded thereon that, when executed on a computer, configure the computer to perform a computer implemented method comprising:

accessing and processing data regarding a single tranche derivative transaction, wherein the single tranche derivative transaction includes a reference portfolio, and wherein the single tranche derivative transaction includes a single transacted tranche n within a capital structure containing a plurality of reference tranches;

determining a level of impairment of each of the plurality of reference tranches following an occurrence of a principal loss in the reference portfolio;

allocating said principal loss in a reverse sequence among the plurality of reference tranches beginning with a most subordinate tranche;

determining an amount of notional principal to restore each of the plurality of reference tranches following an occurrence of a principal shortfall reimbursement or a writedown reimbursement in the reference portfolio;

allocating said principal shortfall reimbursement or writedown reimbursement in sequence among the plurality of reference tranches beginning with a most senior tranche that has been impaired and ending with the most subordinate tranche;

determining an amount of a principal reduction for each of the plurality of reference tranches following a principal payment in the reference portfolio;

allocating the principal payment in sequence among the plurality of reference tranches beginning with the most senior tranche and ending with the most subordinate tranche;

determining an outstanding tranche notional amount of the single transacted tranche n and each of the plurality of reference tranches based on the allocation of principal losses, principal shortfall reimbursements, writedown reimbursements, and principal payments; and calculating the outstanding tranche notional amount of the single transacted tranche n using the formula:

$$\max[(OTN_n * ITF_n) - \Sigma IPL_n + \Sigma IPR_n - \max(\Sigma PP - IPS + LC_n, 0), 0], \text{ wherein:}$$

$OTN_n$ is an original tranche notional for single transacted tranche n, $ITF_n$ is an initial tranche factor for single transacted tranche n, $IPL_n$ is incurred principal losses for single transacted tranche n, $IPR_n$ is incurred principal reimbursements for single transacted tranche n, PP is a principal payment, IPS is an initial portfolio size, and $LC_n$ is a loss cap for single transacted tranche n.

2. The non-transitory computer readable storage medium of claim 1 further comprising calculating the incurred principal loss of the single transacted tranche n for a time period t using the formula:

$$\min(\max(PPL_t - PPR_t, 0), \max(APL_t - LT_n), OTNA_{t-1}),$$
wherein:

$PPL_1$ is periodic principal losses for time period t, $PPR_t$ is periodic principal reimbursements for time period t, $APL_t$ is aggregate principal losses for time period t,
$LT_n$ is a loss threshold for single transacted tranche n, and
$OTNA_{t-1}$ is an outstanding tranche notional amount for a preceding time period t−1.

3. The non-transitory computer readable storage medium of claim 1 further comprising calculating the incurred principal shortfall reimbursement of a single transacted tranche n for a time period t using the formula:

$$\min(\max(PPR_t-PPL_t-\max(APL_{t-1}-LC_i,0),0),\max(\Sigma IPL_t-\Sigma IPR_{t-1},0)), \text{wherein:}$$

$PPR_t$ is periodic principal reimbursements for time period t,
$PPL_t$ is periodic principal losses for time period t,
$APL_{t-1}$ is aggregate principal losses for a preceding time period t−1,
$LC_i$ is a loss cap for reference tranche
$IPL_t$ is incurred principal losses for time period t, and
$IPR_{t-1}$ is incurred principal reimbursements for a preceding time period t−1.

4. A system comprising:
memory which stores at least one program;
at least one processor communicatively coupled to the memory, in which the at least one program, when executed by the at least one processor, causes the at least one processor to:
access and process data regarding a single tranche derivative transaction, wherein the derivative transaction includes a reference portfolio, and wherein the single tranche derivative transaction includes a single transacted tranche n within a capital structure containing a plurality of reference tranches;
determine a level of impairment of each of the plurality of reference tranches following an occurrence of a principal loss in the reference portfolio;
allocate said principal loss in a reverse sequence among the plurality of reference tranches beginning with a most subordinate tranche;
determine an amount of notional principal to restore each of the plurality of reference tranches following an occurrence of a principal shortfall reimbursement or a writedown reimbursement in the reference portfolio;
allocate said principal shortfall reimbursement or writedown reimbursement in sequence among the plurality of reference tranches beginning with a most senior tranche that has been impaired and ending with the most subordinate tranche;
determine an amount of a principal reduction for each of the plurality of reference tranches following a principal payment in the reference portfolio;
allocate the principal payment in sequence among the plurality of reference tranches beginning with the most senior tranche and ending with the most subordinate tranche; and
determine an outstanding tranche notional amount of the transacted tranche and each of the plurality of reference tranches based on the allocation of principal losses, principal shortfall reimbursements, writedown reimbursements, and principal payments;
calculating the outstanding tranche notional amount of the single transacted tranche n using the formula:

$$\max[(OTN_n * ITF_n) - \Sigma IPL_n + \Sigma IPR_n - \max(\Sigma PP - IPS + LC_n, 0), 0], \text{wherein:}$$

$OTN_n$ is an original tranche notional for single transacted tranche n,
$ITF_n$ is an initial tranche factor for single transacted tranche n,
$IPL_n$ is incurred principal losses for single transacted tranche n,
$IPR_n$ is incurred principal reimbursements for single transacted tranche n,
PP is a principal payment,
IPS is an initial portfolio size, and
$LC_n$ is a loss cap for single transacted tranche n.

5. The system of claim 4 further configured to calculate the incurred principal loss of the single transacted tranche n for a time period t using the formula:

$$\min(\max(PPL_t-PPR_t,0),\max(APL_t-LT_n),OTNA_{t-1}), \text{wherein:}$$

$PPL_1$ is periodic principal losses for time period t,
$PPR_t$ is periodic principal reimbursements for time period t,
$APL_t$ is aggregate principal losses for time period t,
$LT_n$ is a loss threshold for single transacted tranche n, and
$OTNA_{t-1}$ is an outstanding tranche notional amount for a preceding time period t−1.

6. The system of claim 4 further configured to calculate the incurred principal shortfall reimbursement of a single transacted tranche n for a time period t using the formula:

$$\min(\max(PPR_t-PPL_t-\max(APL_{t-1}-LC_i,0),0),\max(\Sigma IPL_t-\Sigma IPR_{t-1},0)), \text{wherein:}$$

$PPR_t$ is periodic principal reimbursements for time period t,
$PPL_t$ is periodic principal losses for time period t,
$APL_{t-1}$ is aggregate principal losses for a preceding time period t−1,
$LC_i$ is a loss cap for reference tranche i,
$IPL_t$ is incurred principal losses for time period t, and
$IPR_{t-1}$ is incurred principal reimbursements for a preceding time period t−1.

* * * * *